United States Patent [19]

Iwanaga et al.

[11] 4,296,651
[45] Oct. 27, 1981

[54] AUTOMATIC POWER TRANSMISSION SHIFT VALVE

[75] Inventors: Kazuyoshi Iwanaga, Yokohama; Kazuhiko Sugano, Tokyo; Kunio Ohtsuka, Yokohama, all of Japan

[73] Assignee: Nissan Motor Company, Limited, Yokohama, Japan

[21] Appl. No.: 963,648

[22] Filed: Nov. 24, 1978

[30] Foreign Application Priority Data

Sep. 5, 1978 [JP] Japan .................. 53-108039

[51] Int. Cl.³ .................. B60K 41/06; B60K 41/10
[52] U.S. Cl. .................. 74/869; 74/861; 74/863; 74/864; 74/867
[58] Field of Search .................. 74/856, 857, 861, 863, 74/864, 867, 868, 869

[56] References Cited

U.S. PATENT DOCUMENTS

| | | | |
|---|---|---|---|
| 2,955,482 | 10/1960 | Winchell | 74/856 |
| 3,136,175 | 6/1964 | Ivey | 74/472 |
| 3,605,525 | 9/1971 | Pierce et al. | 74/869 X |
| 3,625,090 | 12/1971 | Chana | 74/869 |
| 3,667,323 | 6/1972 | Irie | 74/864 X |
| 3,685,372 | 8/1972 | Miyazaki | 74/863 |
| 3,691,872 | 9/1972 | Schaefer et al. | 74/864 |
| 3,710,652 | 1/1973 | Miyazaki | 74/869 |
| 3,818,783 | 6/1974 | Norris et al. | 74/864 |
| 3,886,819 | 6/1975 | Lentz | 74/864 X |
| 4,020,718 | 5/1977 | Miyazaki et al. | 74/869 |

FOREIGN PATENT DOCUMENTS

| | | | |
|---|---|---|---|
| 1900938 | 5/1978 | Fed. Rep. of Germany | 74/861 |
| 1919916 | 5/1970 | United Kingdom | 74/863 |
| 1229063 | 4/1971 | United Kingdom . | |
| 1440858 | 6/1976 | United Kingdom . | |

Primary Examiner—Leslie Braun
Attorney, Agent, or Firm—Schwartz, Jeffery, Schwaab, Mack, Blumenthal & Koch

[57] ABSTRACT

A shift valve for use in a hydraulic control system of an automatic power transmission, having valve spools formed with a plurality of pressure acting areas which can be selected independently of each other for providing shift points for upshifting and downshifting under part-throttle and full throttle conditions of the engine.

15 Claims, 3 Drawing Figures

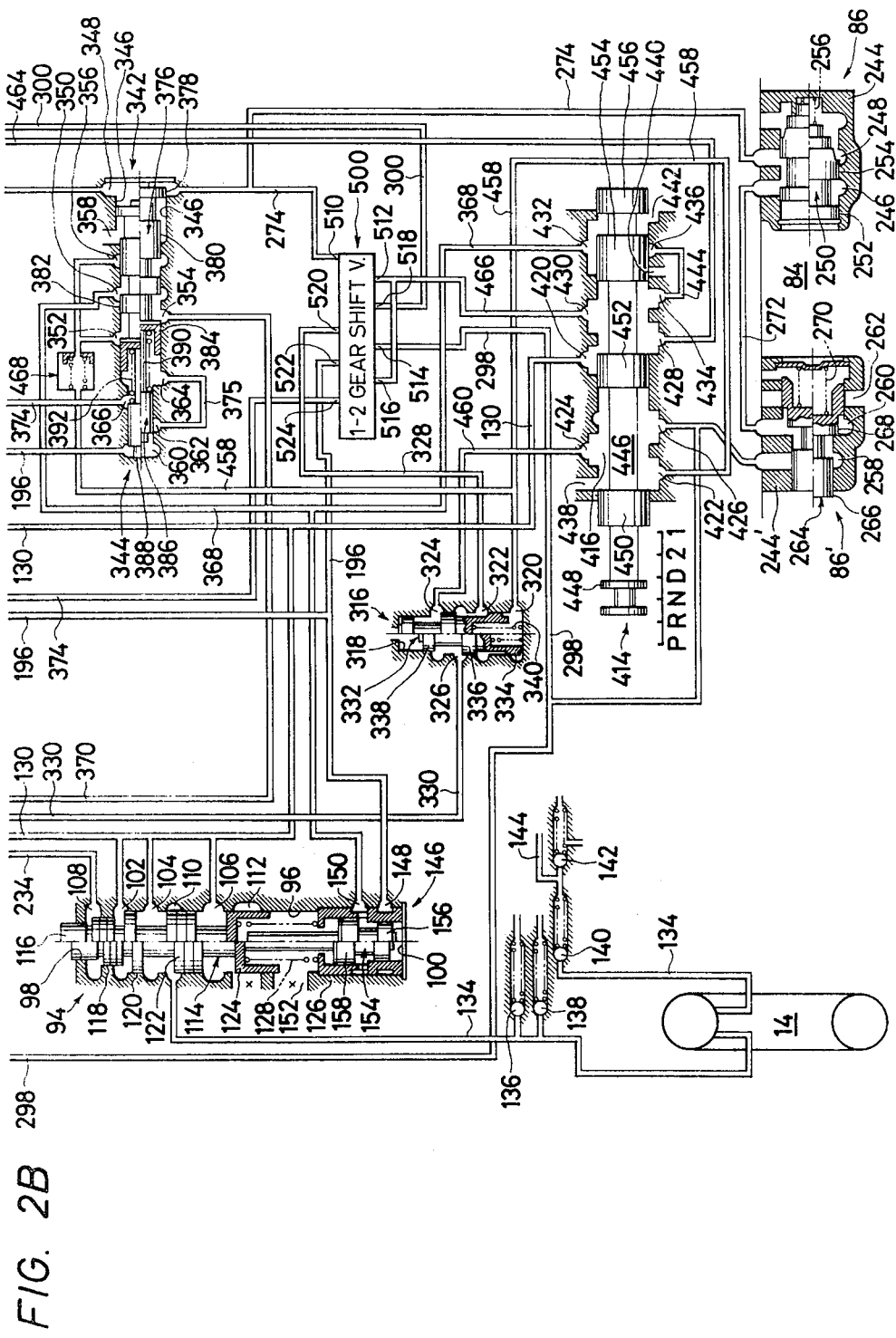

AUTOMATIC POWER TRANSMISSION SHIFT VALVE

FIELD OF THE INVENTION

The present invention relates to a hydraulic control system for the transmission mechanism of an automatic power transmission for an automotive vehicle and, more particularly to a shift valve for incorporation into such a control system.

BACKGROUND OF THE INVENTION

As is well known in the art, a hydraulic control system of an automatic power transmission uses one or mor shift valves each of which is adapted to control shifting between predetermined two gear ratios when the transmission shift lever is in the automatic forward drive range position. Each shift valve is subjected to a throttle pressure variable with load on the engine and to a governor pressure variable with vehicle speed so that an upshift or a downshift between these two gear ratios is automatically effected depending upon the relationship between the load on the engine and the vehicle speed under part throttle conditions of the engine.

When the accelerator pedal is depressed a distance greater than a predetermined value so as to produce a full throttle condition in the engine or a kickdown condition in the transmission system, another fluid pressure is applied to each of the shift valves in the hydraulic control system so that each shift valve is caused or urged to produce downshifting between the gear ratios allocated to the shift valve. In the conventional shift valve for a hydraulic transmission control system, however, the fluid pressure responsive to the kickdown condition is applied to that pressure acting area of the shift valve which is to be reacted upon by the throttle pressure under part-throttle conditions of the engine. For this reason, the respective shift points for downshifting under part-throttle and kickdown conditions can not be selected independently of each other and as a consequence it has been practically impossible to make available such shift points that are satisfactory for both of these conditions.

SUMMARY OF THE INVENTION

It is, accordingly, an object of the present invention to provide an improved transmission gear shift valve which is arranged in such a manner that the shift points to be achieved by the shift valve for upshifting and downshifting under part-throttle and kickdown or full throttle conditions of an engine can be selected independently of each other. It is another object of the present invention to provide an improved transmission gear shift valve adapted to achieve such shift points without having recourse to the axial length of the valve as a whole and to adding to the complexity of the valve construction.

In accordance with the present invention, there is provided in an automatic power transmission including a transmission mechanism adapted to produce at least two predetermined forward drive gear ratios and a hydraulic control system including first control pressure generating means for producing a first control fluid pressure variable with load on the engine, second control pressure generating means for producing a second control fluid pressure variable with vehicle speed, actuating pressure generating means for producing an actuating fluid pressure variable with the first control fluid pressure, and kickdown responsive valve means responsive to kickdown condition in the vehicle for passing the actuating fluid pressure therethrough, a shift valve for incorporation into the hydraulic control system, comprising first passageway means communicating with the first control pressure generating means, second passageway means communicating with the second control pressure generating means, third passageway means communicable with the actuating pressure generating means through the above mentioned kickdown responsive valve means, and at least one valve element movable between a first position for producing in the transmission mechanism the lower one of the aforesaid gear ratios and a second position for producing the higher one of the gear ratios in the transmission mechanism, the valve element being formed with a first pressure acting area to be acted upon by the first control fluid pressure in the first passageway means for urging the valve element in the first position to stay in the first position, a second pressure acting area to be constantly acted upon by the second control fluid pressure in the second passageway means for urging the valve element to stay in or move toward the second position, a third pressure acting area to be acted upon by the actuating fluid pressure in the third passageway means for urging the valve element in the first position to stay in the first position, and a fourth pressure acting area to be acted upon by actuating fluid pressure in the third passageway means for urging the valve element in the second position to move toward the first position thereof.

In a preferred embodiment of the present invention, the shift valve thus constructed and arranged basically comprises first and second valve elements which are arranged in series with each other and each of which has the above mentioned first and second positions, wherein the first and second pressure acting areas of the shift valve are formed on the first valve element and the third and fourth pressure acting areas of the valve are formed on the second valve element. In this instance, it is preferable that the fourth pressure acting area be larger than the third pressure acting area. Such a second valve element may be formed with first, second and third lateral lands which have different across sectional areas and which are axially spaced apart from each other with the second lateral land located between the first and third lateral lands, in which instance the above mentioned third pressure acting area is formed between the second and third lateral lands and the above mentioned fourth pressure acting area is formed between the first and third lateral lands. The second valve element thus formed with the first, second and third lateral lands has a groove between the first and second lateral lands and a groove between the second and third lateral lands. In this instance, the aforesaid third passageway means communicable with the actuating pressure generating means may comprise a single port to which the groove between the second and third lateral lands of the second valve element is open when the valve element is in the first position thereof and both of the grooves between the first, second and third lateral lands are concurrently open when the second valve element is in the second position thereof.

DESCRIPTION OF THE DRAWINGS

Further detailed features and advantages of a transmission gear shift valve proposed by the present invention will be made more apparent from the following description taken in conjunction with the accompanying drawings, in which:

FIGS. 2A and 2B are schematic views showing the general valve arrangement of an example of a hydraulic transmission control system into which a transmission gear shift valve embodying the present invention may be incorporated.

DETAILED DESCRIPTION OF THE INVENTION

Power Transmission Mechanism—General Construction

Figure 1:
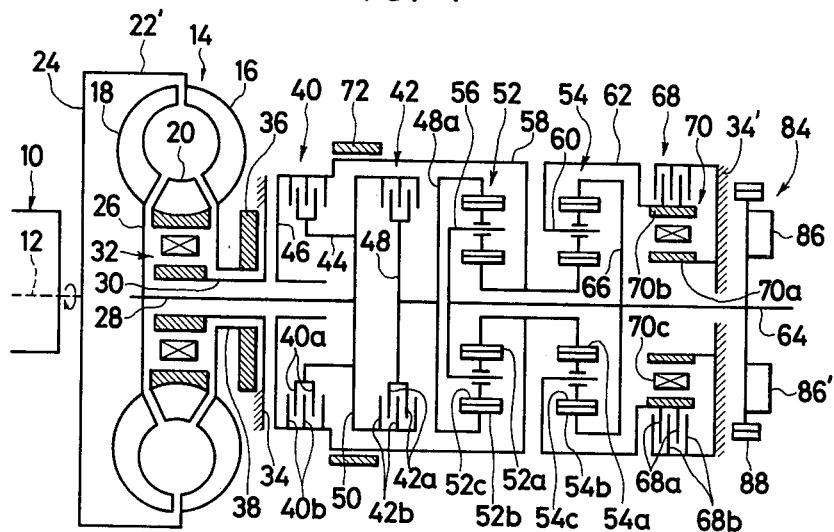
FIG. 1 is a schematic view showing the general construction of a transmission mechanism with which a hydraulic control system to have incorporated therein a transmission gear shift valve according to the present invention may be used in an automatic power transmission for an automotive vehicle.

Description will be hereinafter made regrading the general construction and arrangement of a representative example of an automatic power transmission mechanism to which a hydraulic control system embodying the present invention is to be applied. The transmission mechanism forms part of the power train of an automotive vehicle equipped with a power plant such as an internal combustion engine 10 having a crankshaft 12 as the power output delivering member as partially and schematically illustrated in FIG. 1 of the drawings and is operatively connected to the crankshaft 12 of the engine 10 through a hydrodynamic torque converter 14. The torque converter 14 is herein assumed to be of the three member design by way of example and is thus shown comprising a driving member or pump impeller 16, a driven member or turbine runner 18, and a reaction member or stator 20 as is well known in the art. The pump impeller 16 is connected by a converter cover 22' and a converter driving plate 24 to the crankshaft 12 of the engine 10 and is rotatable with the engine crankshaft 12 about an axis which is aligned with the axis of rotation of the crankshaft 12. The turbine runner 18 is mounted on a turbine support disc 26 which is keyed or splined to a transmission input shaft 28 having a center axis which is also aligned with the axis of rotation of the engine crankshaft 12. The stator 20 serving as the reaction member of the torque converter 14 is positioned between the pump impeller 16 and the turbine runner 18 thus arranged and is mounted on a stator support hollow shaft 30 through a torque converter one-way clutch assembly 32. The stator support hollow shaft 30 has the transmission input shaft 28 axially passed therethrough in substantially coaxial relationship and is fixedly connected to or forms part of a stationary wall structure 34. The stator 20 is permitted to rotate about the center axis of the transmission input shaft 28 in the same direction as the direction of rotation of the pump impeller 16 of the torque converter 14 and accordingly as the direction of rotation of the engine crankshaft 12. Though not shown, each of the pump impeller 16, turbine runner 18 and stator 20 of the torque converter 14 has a number of vanes arranged and inclined in symmetry about the center axis of the transmission input shaft 28. Behind the torque converter 14 thus constructed and arranged is positioned a transmission oil pump assembly 36 including, though not shown, an oil pump body bolted or otherwise secured to the above mentioned stationary wall structure 34 and a drive gear keyed or splined to an oil pump support sleeve 38 coaxially surrounding and rotatable on the outer peripheral surface of the stator support hollow shaft 30 and welded or otherwise securely connected to the pump impeller 16 of the torque converter 14.

When the engine 10 is in operation, the driving power produced by the engine is delivered from the crankshaft 12 of the engine 10 to the pump impeller 16 of the torque converter 14 through the converter driving plate 24 and the converter cover 22' and is transmitted from the pump impeller 16 to the transmission input shaft 28 through the turbine runner 18 of the torque converter 14 with a torque multiplied by means of the stator 20 at a ratio which is variable with the ratio between the revolution speed of the engine crankshaft 12 driving the pump impeller 16 and the revolution speed of the transmission input shaft 28 driven by the turbine runner 18 of the torque converter 14, as is well known in the art. The pump impeller 16 of the torque converter 14 drives not only the turbine runner 18 of the torque converter but the transmission oil pump assembly 36 through the pump support sleeve 38 so that the oil pump assembly 36 delivers oil under pressure which is also variable with the revolution speed of the crankshaft 12 of the engine 10.

The power transmission mechanism herein shown is assumed to be of the three forward speed and one reverse speed type by way of example and comprises first and second or high-and-reverse and forward drive clutches 40 and 42 which are positioned in series at the rear of the transmission oil pump assembly 36. The high-and-reverse clutch 40 comprises a plurality of clutch discs 40a keyed or splined at their inner peripheral edges to a clutch hub 44 and clutch plates 40b keyed or splined at their outer peripheral edges to a front clutch drum 46 which is in part positioned between the clutches 40 and 42 as shown. Likewise, the forward drive clutch 42 comprises a plurality of clutch discs 42a keyed or splined at their inner peripheral edges to a clutch hub 48 and clutch plates 42b keyed or splined at their outer peripheral edges to a rear clutch drum 50. The clutch hub 44 for the high-and-reverse clutch 40 and the rear clutch drum 50 for the forward drive clutch 42 are integral with each other and are rotatable with the transmission input shaft 28 with the rear clutch drum 50 keyed or splined to a rear end portion of the transmission input shaft 28 which axially projects from the stator support hollow shaft 30 as shown. The clutch discs 40a of the high-and-reverse clutch 40 and the clutch plates 42b of the forward drive clutch 42 thus serve as driving friction elements and, accordingly, the clutch plates 40b of the high-and-reverse clutch 40 and the clutch discs 42a of the forward drive clutch 42 serve as driven friction elements in the clutches 40 and 42, respectively. Though not shown in the drawings, each of the clutches 40 and 42 has incorporated therein a return spring urging the clutch discs and plates of the clutch to be disengaged from one another and a clutch piston which is adapted to bring the clutch discs and plates into engagement with one another when moved by a fluid pressure developed in a fluid chamber which is formed between the piston and the clutch drum 46, as is well known in the art.

The power transmission mechanism shown in FIG. 1 further comprises first and second planatary gear assemblies 52 and 54 which are arranged in series at the rear of the forward drive clutch 42. The first planatary gear assembly 52 comprises an externally toothed sun gear 52a and an internally toothed ring gear 52b which have a common axis of rotation aligned with the center axis of the transmission input shaft 28. The clutch hub 48 for the forward drive clutch 42 has a rear extension or flange 48a to which the ring gear 52b of the first planetary gear assembly 52 is keyed or splined as diagrammatically illustrated in the drawing. The first planatary gear assembly 52 further comprises at least two planet pinions 52c each of which is in mesh with the sun and ring gears 52a and 52b and which is rotatable about an axis around the common axis of rotation of the sun and ring gears 52a and 52b. The planet pinions 52c of the first planatary gear assembly 52 are jointly connected to a pinion carrier 56. The second planatary gear assembly 54 is constructed similarly to the first planatary gear assembly 52 and thus comprises an externally toothed sun gear 54a and an internally toothed ring gear 54b which have a common axis of rotation aligned with the center axis of the transmission input shaft 28. The sun gears 52a and 52a of the first and second planatary gear assemblies 52 and 54, respectively, are jointly splined or otherwise fastened to a connecting shell 58 enclosing the forward drive clutch 42 and the first planatary gear assembly 52 therein and integral with or securely connected to the front clutch drum 46 for the high-and-reverse clutch 40. The second planetary gear assembly 54 further comprises at least two planet pinions 54c each of which is in mesh with the sun and ring gears 54a and 54b and which is rotatable about an axis around the common axis of rotation of the sun and ring gears 54a and 54b. The planet pinions 54c of the second planetary gear assembly 54 are jointly connected to a pinion carrier 60 which is keyed or splined at its outer peripheral edge to a connecting drum 62 enclosing the second planetary gear assembly 54 therein. The connecting drum 62 has a rear axial extension extending rearwardly away from the second planetary gear assembly 54 as shown. The respective sun gears 52a and 54a of the first and second planetary gear assemblies 52 and 54 are formed with axial bores through which a transmission output shaft 64 having a center axis aligned with the center axis of the transmission input shaft 28 is passed through and axially extends rearwardly away from the second planetary gear assembly 54. The transmission output shaft 64 is connected to the pinion carrier 56 of the first planetary gear assembly 52 direction at its foremost end portion and further to the ring gear 54b of the second planetary gear assembly 54 through a generally disc shaped connecting member 66 which is keyed or splined at its inner peripheral edge to an intermediate axial portion of the transmission output shaft 64 and at its outer peripheral edge to the ring gear 54b of the second planetary gear assembly 54. The clutches 40 and 42, the planetary gear assemblies 52 and 54 and the connecting members between the clutches and planetary gear assemblies are enclosed within a transmission case (not shown). The previously mentioned stationary wall structure 34 integral with or securely connected to the stator support hollow shaft 30 may be constituted by a front end portion of the transmission case.

Within a rear end portion of the transmission case is positioned a low-and-reverse brake 68. The low-and-reverse brake 68 is herein assumed to be of the multiple disc type by way of example and is, thus, shown composed of a plurality of brake discs 68a keyed or splined at their inner peripheral edges to the rear axial extension of the connecting drum 62 engaging the pinion carrier 60 of the second planetary gear assembly 52, and a plurality of brake plates 68b which are keyed or splined at their outer peripheral edges to a stationary wall structure 34'. The stationary wall structure 34' may be constituted by a rear end portion of the transmission case. Though not shown in the drawings, the low-and-reverse brake 68 has further incorporated therein a return spring urging the brake discs and plates 68a and 68b of the brake unit to be disengaged from one another and a brake piston which is adapted to bring the brake discs and plates 68a and 68b into engagement with one another when the piston is moved by a fluid pressure developed in a fluid chamber which is formed between the piston and the above mentioned stationary wall structure 34', as is well known in the art. It is apparent that the low-and-reverse brake 68 of the multiple disc type as above described may be replaced with a brake unit of the cone type which is well known in the art.

The low-and-reverse brake 68 is paralleled in effect by a transmission one-way clutch 70 which is positioned within the rear axial extension of the above mentioned connecting drum 62. The transmission one-way clutch 70 is assumed to be of the sprag type by way of example and is, thus, shown comprising a stationary inner race member 70a, a rotatable outer race member 70b and a series of spring loaded sprag segments 70c disposed between the inner and outer race members 70a and 70b. The stationary inner race member 70a is centrally bored to have the transmission output shaft 64 axially passed therethrough and is bolted or otherwise securely fastened to the stationary wall structure 34' which may form part of the transmission case. On the other hand, the rotatable outer race member 70b is keyed or splined along its outer periphery to the rear axial extension of the connecting drum 62 carrying the brake discs 68a of the low-and-reverse brake 68. The sprag segments 70c provided between the inner and outer race members 70a and 70b are arranged in such a manner that the sprag segments 70c are caused to stick to the inner and outer race members 70a and 70b and thereby lock up the rotatable outer race member 70b to the stationary inner race member 70a when the outer race member 70b is urged to turn about the center axis of the transmission output shaft 64 in a direction opposite to the direction of rotation of the crankshaft 12 of the engine 10, viz., to the direction of rotation of the transmission output shaft 64 to produce a forward drive mode of an automotive vehicle. The direction of rotation of any member rotatable about an axis coincident or parallel with the center axis of the transmission output shaft 64 will be herein referred to as forward direction if the direction of rotation of the member is identical with the direction of rotation of the transmission output shaft 64 to produce a forward drive condition in a vehicle and as reverse direction if the direction of rotation of the member is identical with the direction of rotation of the transmission output shaft 64 to produce a rearward drive condition of the vehicle. Thus, the above described transmission one-way clutch 70 is adapted to allow the connecting drum 62 and accordingly the pinion carrier 60 of the second planetary gear assembly 54 to turn in the forward direction about the center axis of the transmission output shaft 64 but prohibit the connecting drum 60 and the pinion carrier 60 from being rotated in the reverse direction about the center axis of the transmission output shaft 64. The forward direction herein referred to is identical with the direction of rotation of the crankshaft 12 of the engine 10 and accordingly with the direction of rotation of the transmission input shaft 28. It is apparent that the transmission one-way clutch 70 of the sprag type as above described may be replaced with a one-way clutch of the well known cam and roller type if desired.

Figure 2A:
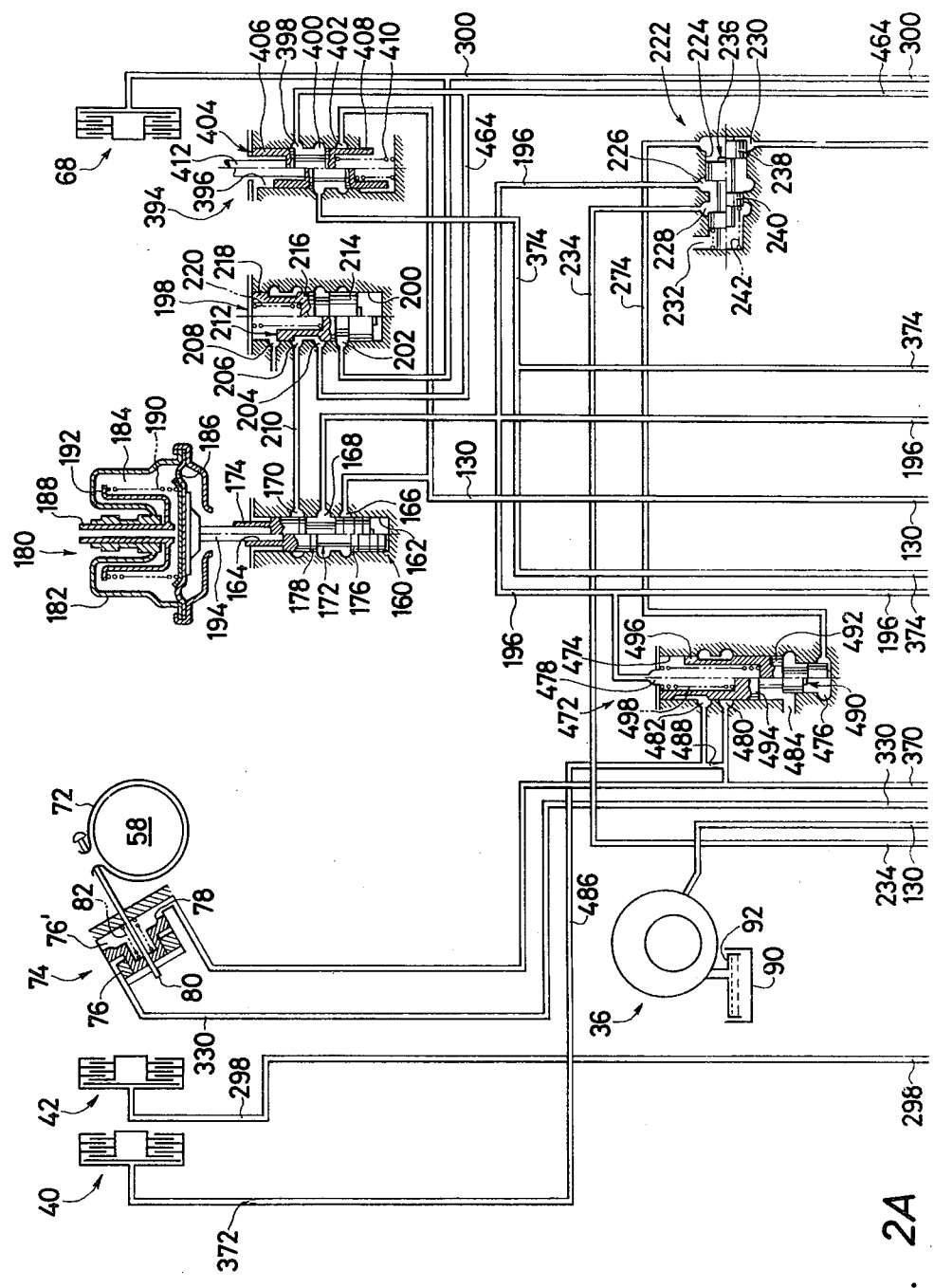

The power transmission mechanism shown in FIG. 1 further comprises a brake band 72 wrapped around the outer peripheral surface of an axial portion of the connecting shell 58 integral with or securely fastened to the clutch drum 46 for the high-and-reverse clutch 40. The brake band 72 is anchored at one end to the transmission casing and is at the other end connected to or engaged by a fluid operated band servo unit 74 which is illustrated at the top of FIG. 2A. Referring to FIG. 2A, the band servo unit 74 has a housing formed with brake-apply and brake-release fluid chambers 76 and 76' which are separated by a servo piston 78 connected by a piston rod 80 to the brake band 72. The servo piston 78 is axially moved in a direction to cause the brake band 72 to be contracted and tightened upon the outer peripheral surface of the connecting shell 58 when there is a fluid pressure developed in the brake-apply fluid chamber 76 in the absence of a fluid pressure in the brake-release fluid chamber 76'. The servo piston 78 is biased to axially move in a direction to contract the brake-apply fluid chamber, via., cause the brake band 72 to be disengaged from the connecting shell 58 by means of a return spring 82 incorporated into the servo unit 74. Furthermore, the piston 78 and the housing of the servo unit 74 are designed so that the piston 78 has a differential pressure acting area effective to move the piston in the particular direction when the piston is subjected to fluid pressures on both sides thereof. When a fluid pressure is built up in the brake-release fluid chamber 76', the servo piston 78 is axially moved in a direction to cause the brake band 72 to expand and disengage from the connecting shell 58 regardless of the presence or absence of a fluid pressure in the brake-apply fluid chamber 76 of the servo unit 74.

Turning back to FIG. 1, the output shaft 64 of the power transmission mechanism thus constructed and arranged projects rearwardly from the transmission case and has mounted thereon a transmission governor assembly 84 consisting of primary and secondary governor valves 86 and 86' which are arranged in diametrically opposed relationship to each other across the center axis of the transmission output shaft 64. Indicated at 88 is a transmission output shaft locking gear which forms part of a parking lock assembly to lock the transmission output shaft 64 during parking of the vehicle and which is mounted together with a transmission oil distributor (not shown) on the transmission output shaft 64. Though not shown in the drawings, the transmission output shaft 64 is connected at the rear end thereof to the final drive mechanism of the vehicle and thus makes up the power train between the internal combustion engine 10 and the driving road wheels of the vehicle, as well known in the art.

Power Transmission Mechanism—Operation

The high-and-reverse and forward drive clutches 40 and 42, the low-and-reverse brake 68, one-way clutch 70 and brake band 72 of the power transmission mechanism having the construction hereinbefore described are operated in accordance with schedules indicated in Table I.

In Table I, the sign "o" indicates that for each of the high-and-reverse, forward-drive and one-way clutches the clutch in question is in a coupled condition and for the low-and-reverse brake 68 the brake is in a condition applied. As to the brake band 72, the sign "o" in the column under "Applied" indicates that the brake band 72 is actuated to lock up the connecting shell 58 and the sign "o" in the column under "Released" indicates that the brake band 72 is released from the disconnecting shell 58. The sign "o" enclosed in the parentheses means that there is a fluid pressure developed in the brake-apply chamber 76 of the servo unit 74 (FIG. 2) but the brake band 72 is released from the connecting drum 58 with a fluid pressure also developed in the brake-release chamber 76' of the servo unit 74.

TABLE 1

| Gear Positions | Clutches High/Rev 40 | Clutches Forward 42 | Low/Rev Brake 68 | One-way Clutch 70 | Brake Band 72 Applied | Brake Band 72 Released |
|---|---|---|---|---|---|---|
| "P" | | | o | | | |
| "R" | o | | o | | | o |
| "N" | | | | | | |
| "D" D1 | | o | | o | | |
| D2 | | o | | | o | |
| D3 | o | o | | | (o) | o |
| "2" | | o | | | o | |
| "1" | | o | o | | | |

The parking, reverse drive and neutral gear positions and the automatic forward drive and manual first and second forward drive ranges as indicated in the leftmost column of Table I are selectively established in the transmission mechanism by manipulating a manually operated transmission gear shift lever (not shown) which have positions "P", "R", "N", "D", "2" and "1" respectively corresponding to the above mentioned gear positions and ranges.

When, now, the transmission gear shift lever is in the parking gear position "P" or the neutral gear position "N", both of the high-and-reverse and forward drive clutches 40 and 42 in the transmission mechanism are held in the uncoupled conditions thereof so that the driving connection between the transmission input and output shafts 28 and 64 is interrupted and as a consequence the transmission output shaft 64 is maintained at rest even though the engine 10 may be in operation delivering its power output from the crankshaft 12. Under these conditions, either the parking gear position or the neutral gear position is established in the transmission mechanism depending upon whether the transmission gear shift lever is in the parking gear position "P" or in the neutral gear position "N". If the transmission gear shift lever is in the parking gear position "P", the low-and-reverse brake 68 is held in the condition applied so that the connecting drum 62 and accordingly the pinion carrier 60 of the second planetary gear assembly 54 are locked to the transmission case. During parking of the vehicle, the transmission output shaft locking gear 88 mounted on the governor 84 is engaged by a locking pawl of the above mentioned parking lock assembly so that the transmission output shaft 64 is locked up to the transmission case.

When the transmission gear shift lever is manually moved into the automatic forward drive range position "D" with the engine 10 operating, the forward drive clutch 42 is caused to couple. The power output delivered from the crankshaft 12 of the engine 10 to the transmission input shaft 28 through the torque converter 14 is transmitted through the forward drive clutch 42 and the clutch hub 48 to the internally toothed ring gear 52b of the first planetary gear assembly 52. The ring gear 52b of the first planetary gear assembly 52 is driven to rotate in the forward direction about the center axis of the transmission output shaft 64 and thereby causes the externally toothed sun gear 52a of the planetary gear assembly 52 to rotate in the opposite direction about the center axis of the shaft 64 through the planet pinions 52c each of which is rotated in the same direction as the ring gear 52b about its own axis of rotation. The externally toothed sun gear 54a of the second planetary gear assembly 54 is rotated with the sun gear 52a of the first planetary gear assembly 52 in the reverse direction about the center axis of the transmission output shaft 64 and causes the internally toothed ring gear 54b of the second planetary gear assembly 54 to turn in the forward direction about the center axis of the transmission output shaft 64. Under these conditions, the individual planet pinions 54c of the second planetary gear assembly 54 are caused to rotate in the forward direction about the respective axes of rotation thereof and therefore attempt to turn in the reverse direction about the center axis of the transmission output shaft 64. The revolution of the pinion carrier 60 of the second planetary gear assembly 54 is, however, prohibited by the one-way clutch 70 connected to the pinion carrier 60 by the connecting drum 62 with the result that the pinion carrier 60 is locked to the transmission case and act as reaction elements for the ring gear 54b which drives the transmission output shaft 64 to rotate in the forward direction about the center axis thereof. The transmission output shaft 64 is connected to the pinion carrier 56 of the first planetary gear assembly 52 so that the planet pinions 52c of the first planetary gear assembly 52 is rotated about the center axis of the transmission output shaft 64 in the same direction as the direction of rotation of the ring gear 52b of the planetary gear assembly 52 but at a revolution speed which is lower with a certain ratio than the revolution speed of the ring gear 52b on which the planet pinions 52c are rolling, thereby creating the first or "low" gear ratio ($D_1$) in the automatic forward drive range in the transmission mechanism.

If the vehicle is thereafter sped up and the vehicle speed reaches a certain level, the band servo unit 74 for the brake band 72 is actuated by a fluid pressure developed in the brake-apply fluid chamber 76 of the servo unit 72 (FIG. 2) and causes the brake band 72 to be tightened around the connecting shell 58 which is keyed or splined to the respective sun gears 52a and 54a of the first and second planetary gear assemblied 52 and 54. The sun gear 52a of the first planetary gear assembly 52 now acts as a reaction element for the planet pinions 52c which are being driven to turn in the forward direction about the center axis of the transmission output shaft 64 by the ring gear 52b rotating with the transmission input shaft 28 through the forward drive clutch 42 which is kept coupled. The driving torque carried over to the ring gear 52b of the first planetary gear assembly 52 through the forward drive clutch 42 is therefore transmitted to the transmission output shaft 64 by means of the planet pinions 52c of the first planetary gear assembly 52 and the associated pinion carrier 56. Under these conditions, the individual planet pinions 52c of the first planetary gear assembly 52 are caused to rotate in the forward direction about the respective axes of rotation thereof and thus roll on the internally toothed ring gear 52b of the planetary gear assembly 52 while rotating in the forward direction about the center axis of the transmission output shaft 64. The transmission output shaft 64 is thus rotated in the forward direction about the center axis thereof at a speed higher than that achieved under the first forward drive gear condition but lower with a certain ratio than the revolution speed of the ring gear 52b of the first planetary gear assembly 52, thereby producing the second or "intermediate" gear ratio "$D_2$" in the automatic forward in the transmission mechanism. Under the second gear ratio condition thus established, the transmission output shaft 64 drives the ring gear 54b of the second planetary gear assembly 54 to rotate in the forward direction about the center axis of the shaft 64 and thereby causes the planet pinions 54c of the planetary gear assembly 54 to turn about the center axis of the transmission output shaft 64 in the same direction as the direction of rotation of the ring gear 54b. Thus, the pinion carrier 60 of the second planetary gear assembly 54 and accordingly the connecting drum 62 are also rotated in the forward direction about the center axis of the transmission output shaft 64 and case the outer race member 70b of the transmission one-way clutch 70 to run idle around the inner race member 70a of the clutch 70.

As the vehicle speed further increases, a fluid pressure is developed in the brake-release fluid chamber 76' of the band servo unit 72 (FIG. 2) and causes the brake band 72 to be released from the connecting shell 58 and, substantially at the same time, the high-and-reverse clutch 40 is actuated to couple. The power output delivered from the crankshaft 12 of the engine 10 to the transmission input shaft 28 is now transmitted on the one hand to the respective sun gears 52a and 54a of the first and second planetary gear assemblied 52 and 54 through the high-and-reverse clutch 40 and the connecting shell 58 released from the brake band 72 and on the other hand to the ring gear 52b of the first planetary gear assembly 52 by way of the forward drive clutch 42 and the clutch hub 48. It therefore follows that the sun gear 52a and the ring gear 52b of the first planetary gear assembly 52 are interlocked together so that the sun and ring gears 52a and 52b and the planet pinions 52c of the first planetary gear assembly 52 as well as the transmission output shaft 64 connected to the planet pinions 52c by the pinion carrier 56 are driven to rotate as a single unit in the forward direction about the center axis of the transmission output shaft 64. The transmission output shaft 64 is thus rotated in the forward direction about the center axis thereof at a speed substantially equal to the revolution speed of the transmission input shaft 28, thereby providing the third of "high" gear ratio ($D_3$) in the automatic forward drive range in the transmission mechanism. Under the third forward drive gear ratio condition thus established, the transmission input shaft 28 driven by the turbine runner 18 of the torque converter 14 is rotated at a speed substantially equal to the revolution speed of the engine crankshaft 12 driving the pump impeller 16 of the torque converter 14 and, as a consequence, there occurs no torque multiplication by the torque converter 14, which thus functions merely as a fluid coupling.

When the manually operated transmission gear shift lever is moved into the reverse drive gear position "R", the high-and-reverse clutch 40 and the low-and-reverse brake 68 are actuated in the transmission mechanism illustrated in FIG. 1. With the high-and-reverse clutch 40 thus coupled, the power output delivered from the crankshaft 12 of the engine 10 to the transmission input shaft 28 by way of the torque converter 14 is transmitted through the clutch 40, front clutch drum 46 and connecting shell 58 to the sun gears 52a and 54a of the first and second planetary gear assemblies 52 and 54, respectively, causing the sun gears 52a and 54a to rotate in the forward direction about the center axis of the transmission output shaft 64. The low-and-reverse brake 68 being actuated to lock the connecting drum 62 to the transmission case, the pinion carrier 60 of the second planetary gear assembly 54 is held stationary with respect to the transmission case, with the result that the planet pinions 54c of the second planetary gear assembly 54 are driven by the sun gear 54a of the second planetary gear assembly 54 for rotation in the reverse direction about their respective axes of rotation. This causes the ring gear 54b of the second planetary gear assembly 54 and accordingly the transmission output shaft 64 to rotate in the reverse direction about the center axis thereof at a speed which is lower with a certain ratio than the revolution speed of the sun gears 52a and 54a of the planetary gear assemblies 52 and 54 and accordingly of the transmission input shaft 28, establishing the reverse drive gear condition in the transmission mechanism.

When the transmission gear shift lever is in the manual second forward drive range position "2", the forward drive clutch 42 and the brake band 72 are actuated in combination and, as a consequence, the transmission output shaft 64 is driven to rotate in the forward direction about the center axis thereof by means of the pinion carrier 56 of the first planetary gear assembly 52 so as to produce the second or "intermediate" gear ratio between the transmission input and output shafts 28 and 64 as in the second gear ratio condition produced with the transmission gear shift lever held in the automatic forward drive range position "D".

Under the condition in which the transmission gear shift lever is moved into the manual first forward drive range position "1", the low-and-reverse brake 68 as well as the forward drive clutch 42 is actuated to lock the pinion carrier 60 of the second planetary gear assembly 54. The transmission output shaft 64 is driven to rotate in the forward direction about the center axis thereof by the ring gear 54b of the second planetary gear assembly 54 having the pinion carrier 60 held stationary with respect to the transmission case so as to produce the first or "low" gear ratio between the transmission input and output shafts 28 and 64, as in the first gear ratio condition produced with the transmission gear shift lever held in the automatic forward drive range position "D". While the pinion carrier 60 of the second planetary gear assembly 54 is locked to the transmission case by the action of the transmission one-way clutch 70 under the first gear ratio condition produced in the automatic forward drive range, the pinion carrier 60 is locked to the transmission case by means of the low-and-reverse brake 68 under the manual first forward drive range condition. During the manual first forward drive range condition, therefore, a driving torque can be transmitted backwardly from the ring gear 54b to the sun gear 54a through the planet pinions 54c in the second planetary gear assembly 54 and, for this reason, the engine can be braked upon by the inertia of the vehicle.

In accordance with the present invention, the clutches and brakes incorporated in the transmission mechanism thus constructed and arranged are actuated selectively by means of a hydraulic control system illustrated in FIG. 1. It should however be borne in mind that the transmission mechanism hereinbefore described with reference to FIG. 1 is merely illustrative of a representative example of a transmission mechanism to which the hydraulic control system according to the present invention is applicable and that the hydraulic control system illustrated in FIGS. 2A and 2B are compatible with any power transmission mechanism including clutches and brakes which are to be actuated in accordance with the schedules indicated in Table 1.

Hydraulic Control System—Arrangement

Referring to FIGS. 2A and 2B, the hydraulic control system for use with the power transmission mechanism illustrated in FIG. 1 is supplied with fluid under pressure from the transmission oil pump assembly 36 which has a suction port communicating with a transmission oil reservoir 90 having an oil strainer 92 installed therein. Though not shown in the drawings, the oil reservoir 90 is provided below a transmission control valve body bolted or otherwise securely attached to the bottom of the transmission case as is well known in the art. The oil strainer 92 is adapted to remove dust from the fluid to be sucked in by the transmission oil pump assembly 36 from the oil reservoir 90 during operation of the vehicle.

The transmission oil assembly 36 is driven by the pump impeller 16 (FIG. 1) of the torque converter 14 as previously noted and delivers at its fluid discharge port a fluid pressure which is variable with the revolution speed of the engine crankshaft driving the pump impeller of the torque converter 14. The fluid pressure delivered from the transmission oil pump assembly 36 is thus subject to fluctuations responsive to various operating conditions of the engine. In order to supress such fluctuations in the fluid pressure delivered from the transmission oil pump assembly 36, the hydraulic control system shown in FIG. 2 comprises a pressure regulator valve 94 which is operative to develop a line pressure Pl which remains substantially constant at low engine speeds and increases as the engine speed is increased within a certain range. When the vehicle speed increases beyond a certain level, the line pressure Pl decreases as the engine speed increases, as will be discussed in more detail as the description proceeds.

The pressure regulator valve 94 comprises an elongated valve chamber 96 which is formed in the above mentioned transmission control valve body and which is contiguous at one axial end to a bore 98 also formed in the control valve body. The valve chamber 96 is closed at the other axial end by an end wall 100 formed by the control valve body or constituted by any plate member attached to the control valve body. The valve chamber 96 has first, second and third line pressure ports 102, 104 and 106, a modified throttle pressure port 108, a torque converter fluid supply port 110 and a drain port 112. With the valve chamber 96 thus arranged is mounted a pressure regulator valve spool 114 which is axially slidable in the valve chamber 96 and which has an axial extension 116 slidably received in the above mentioned bore 98 adjacent to the valve chamber 96. The valve spool 114 has first, second, third and fourth circumferential lands 118, 120, 122 and 124 which are arranged in this sequence away from the extension 116 of the valve spool 114. The circumferential lands 118, 120, 122 and 124 are axially spaced apart from each other and thus form a circumferential groove between every adjacent two of them. The lands of the valve spool 114 have substantially equal cross sectional areas except for the first circumferential land 118 which is smaller in cross sectional area than the remaining lands 120, 122 and 124 as shown. The lands of the valve spool 114 are, furthermore, arranged in such a manner that the individual grooves formed between the first, second, third and fourth circumferential lands 118, 120, 122 and 124 are at all times open to the first, second and third line pressure ports 102, 104 and 106, respectively, and the annular outer end face of the first circumferential land 118 having the extension 116 axial projecting therefrom is constantly subjected to a fluid pressure developed in the modified throttle pressure port 108. The valve spool 114 thus configured is movable within the valve chamber 96 between a first axial position closing the torque converter fluid supply port 110 and the drain port 112 by the third and fourth circumferential lands 122 and 124, respectively, thereof as indicated by the right half of the valve spool 114, and a second axial position having the grooves between the third and fourth circumferential lands 122 and 124 open to the torque converter fluid supply port 110 and the drain port 112, respectively, as indicated by the left half of the valve spool 114. When the valve spool 114 is in the second axial position thereof, communication is provided between the second line pressure port 104 and the torque converter fluid supply port 110 through the groove between the second and third circumferential lands 120 and 122 and between the third line pressure port 106 and the drain port 112 through the groove between the third and fourth circumferential lands 122 and 124. Such communication is blocked when the valve spool 114 is in the first axial position thereof.

Within the valve chamber 96 is further provided a sleeve 126 which is fixedly held in place adjacent to the previously mentioned closed end wall 100 of the valve chamber 96 and which has an annular end wall confronting the fourth circumferential land 124 of the valve spool 114. A preloaded helical compression spring 128 is positioned between the sleeve 126 and the valve spool 114 and is seated at one end on the annular end wall of the sleeve 126 and received at the other end in a blind axial bore formed in the fourth land 124. The pressure regulator valve spool 114 is, thus, biased to move toward the first axial position thereof by means of the spring 128. During operation of the pressure regulator valve 94, the force of the spring 128 thus acting on the valve spool 114 opposes the force resulting from a fluid pressure developed in the first line pressure port 102 and thus acting on the differential pressure acting area between the first and second circumferential lands 118 and 120 of the valve spool 114 and, in the presence of a fluid pressure in the modified throttle pressure port 108 in addition to the fluid pressure in the first line pressure port 102, the force produced by the fluid pressure thus acting on the annular outer end face of the first circumferential land 118 as well.

The first, second and third line pressure ports 102, 104 and 106 of the pressure regulator valve 94 are all in constant communication with the fluid discharge port of the transmission oil pump 36 through a line pressure circuit 130, while the drain port 112 is open to the fluid reservoir 90. If the force of the spring 128 of the pressure regulator valve 94 is overcome by the force resulting from the fluid pressure developed in the first line pressure port 102 or by the sum of the forces resulting from the fluid pressures developed in the line and modified throttle pressure ports 102 and 108, the valve spool 114 of the pressure regulator valve 94 is moved toward the second axial position thereof and allows the fluid in the line pressure circuit 130 to be discharged into the oil reservoir 90 by way of the third line pressure port 106 and the drain port 112 through the groove between the third and fourth circumferential lands 122 and 124 of the valve spool 114. An excess of fluid pressure which may be developed in the line pressure circuit 130 is in this fashion relieved through the drain port 112 of the pressure regulator valve 94 until the fluid pressure in the line pressure circuit 130 is reduced to a certain level at which the force produced by the fluid pressure acting on the valve spool 114 from the first line pressure port 102 or the sum of the forces resulting from the fluid pressures acting on the valve spool 114 from the line and modified throttle pressure ports 102 and 108, respectively, is equalized with the opposing force of the spring 128. When such a level is reached by the fluid pressure in the line pressure circuit 130, the valve spool 114 of the pressure regulator valve 94 is moved toward the first axial position thereof and blocks the communication between the ports 106 and 112 by the fourth circumferential land 124 thereof. If, conversely, the force or the sum of the forces thus exerted on the valve spool 114 against the action of the spring 128 is overcome by the force of the spring 128, then the valve spool 114 is moved toward the first axial position thereof with the result that the fluid confined in the line pressure circuit 130 with the drain port 112 closed by the fourth circumferential land 124 of the valve spool 114 is urged to compress. This causes the fluid pressure in the line pressure circuit 130 to rise until the force or the sum of the forces exerted on the valve spool 114 against the action of the spring 128 becomes equal to the force of the spring 128. In the absence of a fluid pressure in the modified throttle pressure port 108, the valve spool 114 of the pressure regulator valve 94 is in these manners repeatedly moved back and forth or caused to "hunt" between the first and second axial positions thereof in an attempt to assume an equilibrium axial portion in which the force produced by the fluid pressure acting on the differential pressure acting area between the lands 118 and 120 of the valve spool 114 is substantially balanced with the opposing force of the spring 128. The fluid pressure in the line pressure circuit 130 constantly communicating with the first line pressure port 102 of the pressure regulator valve 94 is therefore maintained at a substantially constant level or the line pressure Pl dictated by the force of the spring 128, irrespective of the fluctuations which may occur in the fluid pressure developed at the fluid discharge port of the transmission oil pump assembly 36. When there is a fluid pressure developed in the modified throttle pressure port 108, not only the force resulting from the line pressure Pl acting on the differential pressure acting area of the valve spool 114 but a force produced by the fluid pressure acting on the annular outer end face of the first circumferential land 118 of the valve spool 114 oppose the force of the spring 128 with the result that the line pressure Pl acting on the differential area of the valve spool 114 is reduced or "cut down" to a level which is dictated or variable with the fluid pressure built up in the throttle pressure port 108.

The torque converter fluid supply port 110 of the pressure regulator valve 94 thus constructed and arranged is in constant communication with the torque converter 14 through a torque converter fluid supply circuit 132 and, past the torque converter 14, further with a torque converter fluid discharge circuit 134. The torque converter fluid supply circuit 132 is shown provided with a converter inlet pressure relief valve 136 and a front transmission unit lubricating fluid supply valve 138 and, likewise, the torque converter fluid discharge circuit 134 is shown provided with a converter outlet pressure relief valve 140 and a rear transmission unit lubricating fluid drain-back valve 142. The converter inlet pressure relief valve 136 is adapted to be open and discharge the fluid from the torque converter fluid supply circuit 132 when the pressure of the fluid in the converter fluid supply circuit 132 is higher than a predetermined value. The front transmission unit lubricating fluid supply valve 138 is arranged in parallel, in effect, with the converter inlet pressure relief valve 136 and is operative to pass the converter fluid to the front unit of the transmission mechanism at a limited rate for lubricating the various slidable members and structures forming part of or incorporated into the front transmission unit. On the other hand, the converter outlet pressure relief valve 140 is disposed between the torque converter fluid discharge circuit 134 and a rear transmission unit lubricating fluid circuit 144 and is operative to pass the fluid from the converter fluid discharge circuit 134 to the rear unit of the transmission mechanism through the lubricating fluid circuit 144 when the fluid pressure in the torque converter fluid discharge circuit 134 is higher than a predetermined value. The rear transmission unit lubricating fluid drain-back valve 142 is arranged in parallel, in effect, with the above mentioned rear transmission unit lubricating fluid circuit 144 and is adapted to be open and discharge the fluid from the lubricating fluid circuit 144 when the pressure of the fluid to be passed to the rear transmission unit by way of the fluid circuit 144 is higher than a predetermined value.

Reverting to the pressure regulator valve 94, the sleeve 126 providing a spring seat for the spring 128 of the regulator valve 94 forms part of a line pressure booster valve 146 which is adapted to reduce the line pressure Pl under predetermined operational conditions of the vehicle as will be described in more detail. Thus, the valve chamber 96 having the sleeve 126 accommodated therein further has a throttle pressure port 148, a line pressure port 150 and a drain port 152, which are located at greater spacings from the closed end wall 100 of the valve chamber 96. The sleeve 126 is formed with a cutout located adjacent to the end wall 100 of the valve chamber 96 and open to the throttle pressure port 148 and an opening located in an intermediate axial portion of the sleeve 126 and open to the line pressure port 150 as shown. The drain port 152 is located intermediate between the annular end wall of the sleeve 126 and the drain port 112 of the pressure regulator valve 94 and is open to the transmission oil reservoir 90. The sleeve 126 further has a stepped axial bore having one end at the closed axial end wall 100 of the valve chamber 96 and open at the other end to the drain port 152 through an aperture in the annular end wall of the sleeve 126. A valve spool 154 is in part positioned and axially movable within this stepped axial bore in the sleeve 126 and is formed with first and second circumferential lands 156 and 158 which are axially slidable on the stepped inner peripheral surfaces, respectively, of the sleeve 126 between the closed end wall 100 of the valve chamber 96 and the annular end wall of the sleeve 126. The lands 156 and 158 of the valve spool 154 are axially spaced apart from each other and thus form a circumferential groove therebetween. The second circumferential land 158 is larger in cross sectional area than the first land circumferential 156 so that a differential pressure acting area is provided between the opposite annular end faces of the lands 156 and 158. The valve spool 154 further has an axial extension projecting outwardly from the second circumferential land 158 toward the internal end face of the fourth land 124 of the valve spool 114 of the pressure regulator valve 94 through the aperture in the annular end wall of the sleeve 126, as shown.

When there is a fluid pressure developed in the throttle pressure port 148 of the line pressure booster valve 146 thus constructed and arranged, the fluid pressure acts on the end face of the first land 156 of the line pressure booster valve spool 154 through the above mentioned cutout in the sleeve 126 and forces the valve spool 154 to axially move away from the closed end wall 100 of the valve chamber 96 and brings the axial extension 155 of the valve spool 154 into abutting and thereafter pressing engagement at its leading end with the internal end face of the fourth land 124 of the pressure regulator valve spool 114 as indicated by the left half of the valve spool 154 of the line pressure booster valve 146. Under these conditions, the force of the spring 128 acting on the valve spool 114 of the pressure regulator valve 94 is reinforced by the force thus applied to the valve spool 114 from the valve spool 154 of the pressure booster valve 146 so that the line pressure Pl acting on the differential pressure acting area of the valve spool 114 of the pressure regulator valve 94 through the first line pressure port 102 of the valve 94 is augmented or "boosted" by a value which is proportional to the fluid pressure acting on the end face of the first circumferential land 156 of the valve spool 154 of the line pressure booster valve 146 irrespective of the presence or absence of a fluid pressure in the throttle pressure port 108 of the pressure regulator valve 94. Under predetermined conditions of the vehicle (as when the transmission gear shift lever is in the reverse drive gear position "R" as will be discussed), a fluid pressure (line pressure) is developed in the line pressure port 150 in addition to the fluid pressure developed in the throttle pressure port 148 of the booster valve 146 and acts on the differential pressure acting area between the first and second circumferential lands 156 and 158 of the line pressure booster valve 146. Under these conditions, the line pressure Pl acting on the differential pressure acting area of the valve spool 114 of the pressure regulator valve 94 is opposed not only by the force of the spring 128 and the force resulting from the fluid pressure acting on the outer end face of the first circumferential land 156 of the valve spool 154 of the line pressure booster valve 146 but by the fluid pressure acting on the differential pressure acting area of the booster valve spool 154 and so that the line pressure Pl developed by the pressure regulator valve 94 is further increased or "boosted".

The fluid pressure to be introduced into the throttle pressure port 148 of the line pressure booster valve 146 is developed by a vacuum operated transmission throttle valve 160 which is shown at an upper part of FIG. 2A.

The transmission throttle valve 160 is provided in an elongated valve chamber 162 formed in the previously mentioned transmission control valve body (not shown) and which is closed at one axial end and contiguous at the other axial end to an axial bore 164 aligned with the valve chamber 162 and open to the outside of the transmission control valve body. The valve chamber 162 has a line pressure port 166, a throttle pressure port 168 and a throttle back-up pressure port 170, which are arranged in this sequence away from the closed axial end of the valve chamber 162. Within the valve chamber 162 thus formed is mounted a throttle valve spool 172 which is axially slidable in the valve chamber 162 and which has an axial extension 174 axially slidable through the above mentioned axial bore 164 and projecting outwardly from the bore 164. The valve spool 172 has first and second circumferential lands 176 and 178 which are also arranged in this sequence away from the closed axial end of the valve chamber 162. The circumferential lands 176 and 178 are substantially equal in cross sectional area and are axially spaced apart from each other so as to form therebetween a circumferential groove which is constantly open to the throttle pressure port 168 irrespective of the axial position of the valve spool 172 within the valve chamber 162. As indicated by dotted lines in the drawing, the throttle valve spool 172 is further formed with a diametrical passageway which is open at its opposite ends to the above mentioned groove between the first and second dircumferential lands 176 and 178 and an axial passageway leading from the diametrical passageway and open at the outer axial end of the first circumferential land 176 located adjacent to the closed axial end of the valve chamber 162. The throttle valve spool 172 thus configured is movable in the valve chamber 162 between a first axial position closest to the closed axial end of the valve chamber 162 and having the groove between the lands 176 and 178 open not only to the throttle pressure port 168 but to the line pressure port 166 as indicated by the left half of the valve spool 172 and a second axial position spaced away from the closed axial end of the valve chamber 162 and closing the line pressure port 166 by the first circumferential land 176 thereof as indicated by the right half of the valve spool 172. The throttle back-up pressure port 170 is closed completely by the second circumferential 178 of the valve spool 172 when the valve spool 172 is in the first axial position thereof. When the valve spool 172 is in the second axial position thereof, the second circumferential land 178 of the valve spool 172 is located to be on the point of forming a clearance between the throttle back-up pressure port 170 and the groove between the lands 176 and 178 of the valve spool 172.

The transmission throttle valve 160 thus constructed and arranged is operated in accordance with the variation in the driving torque of the engine 10 (FIG. 1) valve actuating by means comprised of a vacuum responsive diaphragm assembly 180 which is responsive to the vacuum developed in the intake manifold (not shown) of the engine. As is well known in the art, the vacuum developed in the intake manifold of an internal combustion engine varies with the opening degree of the throttle valve in the carburetor (not shown) of the engine and accordingly with the amount of load exerted on the engine and is, therefore, representative of the driving torque delivered from the output shaft of the engine.

In FIG. 2A, the diaphragm assembly 180 is shown comprising a casing 182 formed with a vacuum chamber 184 which is defined in part by a flexible diaphragm element 186 secured along its outer skirt to the casing 182. The vacuum chamber 184 is in constant communication with the intake manifold of the engine through a conduit 188 which is open at one end into the vacuum chamber 184 and which is in part secured to the casing 182. The diaphragm element 186 is urged to move with respect to the casing 182 in a direction to expand the vacuum chamber 184 by suitable biasing means which is shown comprising a preloaded helical compression spring 190 positioned within the vacuum chamber 184 and seated at one end on a spring seat disc fast on the inner face of the diaphragm element 186 and at the other end on a spring retaining element 192 secured to the casing 182. An elongated push rod 194 is fastened at one end to the outer face of the diaphragm element 186 and axially projects in a direction opposite to the vacuum chamber 184 so as to be axially movable back and forth as the vacuum chamber 184 is contracted and expanded. The push rod 194 is connected at the other end thereof to the above described axial extension 174 of the valve spool 172 of the transmission throttle valve 160 so that the throttle valve spool 172 is axially moved between the first and second axial positions thereof as the diaphragm element 186 of the assembly 180 is moved in the directions to produce expansion and constraction, respectively, of the vacuum chamber 184 in the casing 182. In the absence of a vacuum in the vacuum chamber 184, the diaphragm element 186 is held in a position producing maximum expansion of the vacuum chamber 184 by the force of the compression spring 190 acting on the diaphragm element 186 as shown in the drawing. If there is no fluid pressure developed in the throttle pressure port 168 of the throttle valve 160, the throttle valve spool 172 is held in the first axial position closing both of the line pressure port 166 and the throttle back-up pressure port 170 as indicated by the left half of the valve spool 172. When there is a fluid pressure developed in the throttle pressure port 168, the fluid pressure is conducted through the diametrical and axial passageway in the valve spool 172 to the closed axial end of the valve chamber 162 and acts on the outer end face of the first circumferential land 176 of the valve spool 172, which is consequently urged to axially move away from the first axial position thereof with a force produced by the fluid pressure thus acting on the outer end face of the land 176. If, under these conditions, a vacuum is developed in the vacuum chamber 184 of the diaphragm assembly 180, the diaphragm element 186 is forced to move against the force of the compression spring 190 in the direction to contract the vacuum chamber 184 so that the throttle valve spool 172 connected to the diaphragm element 186 by the push rod 194 is allowed to move toward the second axial position thereof. If, in this instance, the valve spool 172 is moved beyond the second axial position thereof, a clearance is provided between the throttle back-up pressure port 170 and the circumferential groove between the lands 176 and 178 of the valve spool 172 and allows the fluid in the throttle pressure port 168 to the enter the throttle back-up pressure port 170 through such a clearance. When this occurs, the fluid pressure in the throttle pressure port 168 is diminished by a value proportional to the amount of fluid allowed into the throttle back-up pressure port 170 from the throttle pressure port 168. Thus, the valve spool 172 of the throttle valve 160 assumes an equilibrium axial position when the force of the spring 190 urging the valve spool 172 to move toward the first axial position thereof by means of the push rod 194 is equally balanced with the sum of the force produced by the vacuum developed in the vacuum chamber 184 of the diaphragm assembly 180 and the force produced by the fluid pressure acting on the outer end face of the first circumferential land 176 of the valve spool 172 of the throttle valve 160. If the vacuum in the vacuum chamber 184 is increased under these conditions, the valve spool 172 is further moved beyond the second axial position thereof and causes enlargement of the clearance between the throttle back-up pressure port 170 and the groove between the lands 176 and 178 of valve spool 172 and gives rise to a further decrease in the fluid pressure in the throttle pressure port 168 of the throttle valve 160. If, conversely, the vacuum in the vacuum chamber 184 of the diaphragm assembly 180 is reduced under the above described condition, the valve spool 172 of the throttle valve 160 is moved back toward the second axial position thereof and thus reduced the above mentioned clearance, giving rise to an increase in the fluid pressure in the throttle pressure port 168. As the vacuum in the vacuum chamber 184 is further reduced, the throttle valve spool 172 is moved past the second axial position toward the first axial position thereof and provides communication between the line and throttle pressure ports 166 and 168 as indicated by the left half of the valve spool 172. Under these conditions, the fluid pressure in the line pressure port 166 is introduced into the throttle pressure port 168 through the groove between the lands 176 and 178 of the valve spool 172 and causes the fluid pressure in the throttle pressure port 168 toward the level of the fluid pressure in the line pressure port 166 until the valve spool 172 reaches an equilibrium axial position close to the first axial position thereof. The throttle back-up pressure port 170 is drained off except under predetermined conditions as will be described later so that the fluid pressure allowed to enter the port 170 from the throttle pressure port 168 when the valve spool 172 is moved into an axial position past the second axial position thereof is discharged to the transmission oil reservoir 90. The line pressure port 166 is in constant communication with the previously described line pressure circuit 130, while the throttle pressure port 168 is in constant communication with the throttle pressure port 148 of the line pressure booster valve 146 through a throttle pressure circuit 196.

The fluid pressure developed in the throttle pressure port 168 of the throttle valve 160 and accordingly in the throttle pressure circuit 196 above mentioned is, thus, variable with the vacuum developed in the vacuum chamber 184 of the diaphragm assembly 160 and accordingly with the driving torque delivered from the engine in operation and is herein referred to as throttle pressure and denoted by Pt. The throttle pressure Pt increases and decreases with an increase and a decrease, respectively, in the output torque of the engine, as is well known in the art.

Under predetermined conditions, there is developed in the throttle back-up pressure port 170 of the throttle valve 160 a fluid pressure which is higher than the throttle pressure Pt developed by the throttle valve 160 per se in the above described manners. Such a fluid pressure, herein referred to as throttle back-up pressure, is developed by a throttle back-up valve 198 illustrated beside the throttle valve 160.

The throttle back-up valve 198 is provided in an elongated valve chamber 200 formed in the transmission control valve body and closed at both axial ends thereof. The valve chamber 200 has first and second line pressure ports 202 and 204, a throttle back-up pressure port 206 and a drain port 208, which are arranged in this sequence away from one axial end of the valve chamber 200. The throttle back-up pressure port 206 is in constant communication with the throttle back-up pressure port 170 of the above described throttle valve 160 through a fluid passageway 210. Within the valve chamber 200 thus formed is mounted a valve spool 212 which is axially slidable in the valve chamber 200. The valve spool 212 has first, second and third circumferential lands 214, 216 and 218 which are axially spaced apart from each other so as to form a circumferential groove between every adjacent two of them. The groove formed between the first and second circumferential lands 214 and 216 of the valve spool 212 is open selectively to the first or second line pressure port 202 or 204 depending upon the axial position of the valve spool 212 within the valve chamber 200, while the groove formed between the second and third circumferential lands 216 and 218 is constantly open to the throttle back-up pressure port 206 without respect to the axial position of the valve spool 212 and is isolated from or open to the drain port 208 depending upon the axial position of the valve spool 212 within the valve chamber 200. The valve spool 212 is thus movable within the valve chamber 200 between a first axial position having the groove between the first and second circumferential lands 214 and 216 open to the first line pressure port 202 and the groove between the second and third circumferential lands 216 and 218 open to both the second line pressure port 204 and the throttle back-up pressure port 206 as indicated by the left half of the valve spool 212, and a second axial position having the groove between the first and second circumferential lands 214 and 216 open to the second line pressure port 204 and the groove between the second and third circumferential lands 216 and 218 open to both the throttle back-up pressure port 206 and the drain port 208 as indicated by the right half of the valve spool 212. The lands of the throttle back-up valve spool 212 have substantially equal cross sections except for the third circumferential land 218 which is slightly larger in cross section than the remaining lands 214 and 216. Between the second and third circumferential lands 216 and 218 of the valve spool 212 is therefore formed a differential pressure acting area so that, when there is a fluid pressure developed in the circumferential groove between these lands 216 and 218, the valve spool 212 is urged to move toward the second axial position thereof. As indicated by dotted lines, the valve spool 212 is further formed with a diametrical passageway which is open at both ends to the groove between the first and second circumferential lands 214 and 216 and an axial passageway leading from the diametrical passageway and open at the outer axial end of the first circumferential land 214 of the valve spool 212. When there is a fluid pressure developed in the groove between the first and second circumferential lands 214 and 216 of the valve spool 212 therefore, the fluid pressure is conducted through these diametrical and axial passageways in the valve spool 212 and acts on the outer end face of the first circumferential land 214 of the valve spool 212, urging the valve spool 212 to move toward the second axial position thereof. In the presence of a fluid pressure acting on the differential pressure acting area between the lands 216 and 218 of the valve spool 212, the valve spool 212 is urged to move toward the second axial position thereof by the sum of the force thus produced by the fluid pressure acting on the differential pressure acting area of the valve spool 212 and the force of the fluid pressure produced by the fluid pressure acting on the end face of the first circumferential land 214 of the valve spool 212. The force or the sum of the forces thus urging the valve spool 212 to move toward the second axial position thereof is opposed by the force of a preloaded compression spring 220 which is seated at one end on a wall surface defining one axial end of the valve chamber 200 and at the other end thereof on an internal end face formed in the third circumferential land 218 of the valve spool 212 as shown.

In the absence of a fluid pressure in any of the pressure ports 202, 204 and 206 of the throttle back-up valve 198, the valve spool 212 of the valve 198 is maintained in the first axial position by the force of the spring 220 so that the first line pressure port 202 is open to the groove between the first and second circumferential lands 214 and 216 and the second line pressure port 204 and the throttle back-up pressure port 206 are jointly open to the groove between the second and third circumferential lands 216 and 218 as indicated by the left half of the valve spool 212. If a fluid pressure is developed in the second line pressure port 204, the fluid pressure acts on the differential pressure acting area between the second and third circumferential lands 216 and 218 of the valve spool 212, which is therefore moved away from the first axial position closing the second line pressure port 204 by the second circumferential land 216 thereof. When the valve spool 212 is in this axial position, the third circumferential land 218 of the valve spool 212 forms a small clearance between the drain port 208 and the groove between the second and third circumferential lands 216 and 218, allowing fluid to leak from the back-up throttle pressure port 206 into the drain port 208 at a limited rate through such a clearance. In the throttle back-up pressure port 206 is therefore developed a fluid pressure which is lower than the line pressure Pl in the port 204 by the valve spool 212 attempting to stay in an equilibrium axial position in which the force resulting from the fluid pressure acting on the differential pressure acting area between the lands 216 and 218 is equally balanced with the force of the spring 220. The fluid pressure thus developed in the throttle back-up pressure port 206 of the throttle back-up valve 198 is herein referred to as throttle back-up pressure and is delivered through a fluid pressure passageway 210 to the throttle back-up pressure port 170 of the transmission throttle valve 160. When the valve spool 212 of the throttle back-up valve 198 is held in the above mentioned equilibrium axial position establishing the throttle back-up pressure in the port 206 of the valve 198, the groove between the first and second circumferential lands 214 and 216 is open to the first line pressure port 202 of the throttle back-up valve 198. If a fluid pressure is developed in the first line pressure port 202, the fluid pressure is passed through the radial and axial passageways in the valve spool 212 and acts on the outer end face of the first circumferential land 214 of the valve spool 212. This causes the valve spool 212 to axially move into the second axial position thereof against the force of the spring 220. When the valve spool 212 is moved to the second axial position thereof, the first line pressure port 202 is closed by the first circumferential land 214 of the valve spool 212 and, in turn, the second line pressure port 204 is open to the groove between the first and second circumferential lands 214 and 216 and maintains the fluid pressure acting on the end face of the land 214. The valve spool 212 is held in the second axial position thereof until the second line pressure port 204 of the throttle back-up valve 198 is drained off. When the valve spool 212 is moved into the second axial position thereof, the throttle back-up pressure which has been developed in the throttle back-up port 206 of the throttle back-up valve 198 and accordingly in the throttle back-up pressure port 170 of the throttle valve 160 is discharged to the transmission oil reservoir 90 through the drain port 208 of the throttle back-up valve 198.

While the throttle pressure port 148 of the line pressure booster valve 146 is in constant and direct communication with the throttle pressure port 168 of the throttle valve 160 through the throttle pressure circuit 196, the throttle pressure port 108 of the pressure regulator valve 94 is communicable with the throttle pressure port 168 of the throttle valve 160 across a pressure modifier valve 222 which is shown below the throttle back-up valve 198.

The pressure modifier valve 222 is adapted to reduce and modify the line pressure Pl in response to a vehicle speed higher than a predetermined value and is provided in an elongated valve chamber 224 formed in the previously mentioned transmission control valve body. The valve chamber 224 is closed at both axial ends and has a throttle pressure inlet port 226 and a modified pressure outlet port 228 which are located between the axial ends of the valve chamber 224, a governor pressure port 230 located at one axial end of the valve chamber 224 and a drain port 232 located at the other axial end of the valve chamber 224. The throttle pressure inlet port 226 is in constant communication with the throttle pressure circuit 196, and the modified pressure outlet port 228 is in constant communication with the modified pressure port 108 of the pressure regulator valve 94 through a fluid passageway 234. The governor pressure port 230 communicates with the governor pressure circuit 274. Within the valve chamber 224 thus formed is mounted a valve spool 236 which is axially slidable in the valve chamber 224 between the axial ends of the chamber. The valve spool 236 has first and second circumferential lands 238 and 240 which are axially spaced apart from each other and which thus form therebetween a circumferential groove which is constantly open to the throttle pressure inlet port 226 irrespective of the axial position of the valve spool 236 within the valve chamber 224. The valve spool 236 is axially movable in the valve chamber 224 between a first axial position providing communication between the modified pressure outlet port 228 and the drain port 232 as indicated by the lower half of the valve spool 236, and a second axial position blocking the communication between the ports 228 and 232 and, in turn, providing communication between the throttle pressure inlet and modified pressure outlet ports 226 and 228 through the circumferential groove between the lands 238 and 240 as indicated by the upper half of the valve spool 236. The valve spool 236 is urged to move toward the first axial position thereof by means of a preloaded helical compression spring 242 which is seated at one end on a wall surface located at one axial end of the valve chamber 224 adjacent to the drain port 232 and at the other axial end on the outer end face of the second circumferential land 240 as shown. The first circumferential land 238 of the valve spool 236 is larger in cross sectional area than the second circumferential land 240 of the spool so that a differential pressure acting area is formed between the first and second circumferential lands 238 and 240 of the valve spool. When there is a fluid pressure developed in the groove between the first and second circumferential lands 238 and 240 of the valve spool 236, therefore, the valve spool 236 is urged to move toward the first axial position thereof not only by the force of the spring 242 but by a force produced by the fluid pressure thus acting on the differential pressure acting area of the valve spool 236. If a governor pressure Pg continuously variable with vehicle speed is developed in the governor pressure port 230 under these conditions as will be described later, the forces thus urging the valve spool 236 to move toward the first axial position of the spool are opposed by a force which is produced by the governor acting on the outer end face of the first circumferential land 238 and urging the valve spool 236 to move toward the second axial position thereof. In an attempt to assume an equilibrium axial position between the first and second axial position thereof, the valve spool 236 of the pressure modifier valve 222 is thus operative to develop in the modified pressure outlet port 228 a modified throttle pressure with which the force resulting from the governor pressure Pg acting on the first circumferential land 238 of the valve spool 236 is substantially equally balanced with the sum of the force of the spring 242 and the force produced by the modified throttle pressure acting on the differential pressure acting area between the first and second circumferential lands 238 240 of the valve spool 236. The modified throttle pressure thus appearing at the modified pressure outlet port 228 of the pressure modifier valve 222 is continuously variable not only with the throttle pressure Pt and accordingly the opening degree of the carburetor throttle valve but also with the governor pressure Pg and accordingly the road speed of the vehicle. The modified throttle pressure produced by the pressure modifier valve 222 in this manner is passed through the fluid passageway 234 to the modified throttle pressure port 108 of the pressure regulator valve 94 and serves to reduce the line pressure Pl depending upon a predetermined relationship between the road speed of the vehicle and the opening degree of the carburetor throttle valve. The above mentioned predetermined relationship is dictated by the force of the spring 242 and the differential between the respective cross sectional areas of the first and second circumferential lands 238 and 240 of the valve spool 236 of the pressure modifier valve 222. The fluid pressure to be developed in the governor pressure port 230 of the pressure modifier valve 222 above described is variable with the road speed of the vehicle and is developed by the transmission governor assembly 84 which is illustrated in FIG. 2B at a lower part of the drawing.

As previously noted, the transmission governor assembly 84 is mounted on the output shaft 64 (FIG. 1) of the power transmission mechanism and consists of the primary and secondary governor valves 86 and 86'. As is well known in the art, the primary governor valve 86 is a sort of "on-off" type valve and is adapted to be open when the revolution speed of the transmission output shaft is higher than a predetermined value, while the secondary governor valve 86' is a sort of proportioning valve which delivers an output pressure continuously variable with the revolution speed of the transmission secondary governor valves of these natures are well known in the art and may be readily modified by those skilled in the art, only important features of the constructions herein shown will be hereinafter described.

The primary and secondary governor valves 86 and 86' are built into a common valve body which is shown to be split into two valve body portions 244 and 244' having the primary and secondary governor valves 86 and 86', respectively, accommodated therein. The valve body portions 244 and 244' are usually mounted on the transmission output shaft in diametrically opposed relationship to each other across the center axis of the shaft, though not shown in the drawings. The valve body portion 244 for the primary governor valve 86 is formed with a valve chamber having fluid inlet and outlet ports 246 and 248. Within the valve chamber is provided a valve spool 250 axially slidable in the valve chamber and having first and second circumferential lands 252 and 254 which are axially spaced apart from each other and which form therebetween a circumferential groove which is constantly open to the fluid inlet port 246. The valve spool 250 is urged to move toward the transmission output shaft by a preloaded compression spring 256. When the transmission output shaft is held at rest, the valve spool 250 is maintained in an axial position closest to the transmission output shaft by the force of the spring 256 so that the fluid outlet port 248 is closed by the second circumferential land 254 of the valve spool 250, as indicated by the lower half of the valve spool 250. On the other hand, the valve body portion 244' for the secondary governor valve 86' is formed with a valve chamber having not only fluid inlet and outlet ports 258 and 260 but also a drain port 262. Within the valve chamber is provided a weighted valve spool 264 axially slidable in the valve chamber and having a first circumferential land 266 and a second circumferential land 268. The lands 266 and 268 are axially spaced from each other and have formed therebetween a circumferential groove which is open to the fluid inlet port 258 or the fluid outlet port 260 depending upon the axial position of the valve spool 264 within the valve chamber. The valve spool 264 is urged to move away from the transmission output shaft by a preloaded compression spring 270. The second circumferential land 268 is larger in cross sectional area than the first circumferential land 266 so that a differential pressure acting area is formed between the lands 266 and 268. The fluid output port 260 of the secondary governor valve 86' is in constant communication with the fluid inlet port 246 of the primary governor valve 86 through a passageway 272 formed in the governor valve body constructed by the valve body portions 244 and 244'. In the fluid inlet port 258 of the secondary governor valve 86' is developed the line pressure Pl when the transmission gear shift lever is in the automatic or manual forward drive range position "D", "2" or "1" as will be described later. When the transmission output shaft is held at rest with the engine also held at rest, there is no fluid pressure developed in the fluid inlet port 258 of the secondary governor valve 86' so that the valve spool 264 of the secondary governor valve 86' is held in an axial position remotest from the transmission output shaft by the force of the spring 270 as indicated by the lower half of the valve 86'. When valve spool 264 is held in this axial position, the fluid inlet port 258 is open to the circumferential groove between the lands 266 and 268 and the fluid outlet port 260 and the drain port 262 are closed by the second circumferential land 268 of the spool 264.

When the engine is started under these conditions and thereafter the transmission gear shift lever is moved to any of the above mentioned positions, the line pressure Pl developed by the pressure regulator valve 94 is introduced by way of the forward drive clutch actuating fluid circuit 298 into the fluid inlet port 258 of the secondary governor valve 86' and acts on the differential pressure acting area between the lands 266 and 268 of the valve spool 264. The valve spool 264 of the secondary governor valve 86' is therefore urged to move toward the transmission output shaft against the force of the spring 270 with the result that the valve spool 264 is maintained in an axial position in which the groove between the lands 266 and 268 is located to be open to the fluid outlet port 260 as indicated by the upper half of the governor valve 86', with the force of the spring 270 equally balanced by the forced produced by the fluid pressure acting on the differential pressure acting area of the valve spool 264. When the transmission output shaft is being driven for rotation about the center axis thereof, the force thus urging the valve spool 264 to move toward the transmission output shaft is opposed not only by the force of the spring 270 but a centrifugal force created in the weighted valve spool 264 accommodated in the valve body portion 244' revolving with the shaft. The valve spool 264 is therefore moved within the valve chamber in an attempt to assume an equilibrium axial position in which the fluid pressure acting on the differential pressure acting area of the spool 264 is equalized with the sum of the force of the spring 270 and the centrifugal force exerted on the valve spool 264. A fluid pressure varying with the centrifugal force produced in the valve spool 264 and accordingly with the angular velocity of the transmission output shaft about the center axis thereof is in this fashion developed in the fluid outlet port 260 of the secondary governor valve 86'. The fluid pressure thus developed by the secondary governor valve 86' is referred to as governor pressure and is herein denoted by Pg. The governor pressure Pg is continuously variable with the revolution speed of the transmission output shaft and accordingly with the road speed of the vehicle. When the transmission output shaft is being rotated about the center axis thereof, a centrifugal force is also produced in the weighted valve spool 250 of the primary governor valve 86 and urges the valve spool 250 to move radially away from the transmission output shaft against the force of the spring 256. Until the revolution speed of the transmission output shaft reaches a predetermined value, however, the centrifugal force thus exerted on the primary governor valve spool 250 is overcome by the force of the spring 256 so that the valve spool 250 is maintained in situ within the valve body portion 244 revolving with the transmission output shaft. Under these conditions, the governor pressure Pg directed from the fluid output port 260 of the secondary governor valve 86' to the fluid inlet port 246 of the primary governor valve 86 through the passageway 272 is precluded from being passed to the fluid outlet port 248 of the primary governor valve 86 by the second circumferential land 254 of the primary governor valve spool 250 closing the port 248. When the above mentioned predetermined value is reached by the revolution speed of the transmission output shfat, the force of the spring 256 of the primary governor valve 86 is overcome by the centrifugal force exerted on the valve spool 250 and allows the valve spool 250 to move radially away from the transmission output shaft. Communication is now established between the fluid inlet and outlet ports 246 and 248 of the primary and secondary governor valves 86 and 86' through the circumferential groove between the lands 252 and 254 of the valve spool 250, with the result that the governor pressure Pg which has been developed in the fluid inlet port 246 is allowed into the fluid outlet port 248 of the primary governor valve 86. The primary governor valve 86 is thus operative to pass the governor pressure Pg therethrough when the governor pressure Pg is higher than the predetermined value. The governor pressure Pg delivered from the fluid outlet port 248 of the primary governor valve 86 is distributed by way of a governor pressure circuit 274 to the transmission gear shift valves incorporated into the hydraulic control system.

In the hydraulic control system illustrated in FIG. 2B, the transmission shift valve according to the present invention is assumed, by way of example, to be constituted by a first-second gear shift valve 500 for automatically controlling shifts between the first and second forward drive gear positions in the automatic forward drive range "D" or in the manual first forward drive range "1". As illustrated more clearly in FIG. 3, the first-second gear shift valve 500 comprises a wall portion 502 forming part of the body structure of previously mentioned transmission control valve assembly and formed with an elongated valve chamber 504 which is closed at both axial ends by internal wall surfaces 506 and 508 of the wall portion 502. The wall portion 502 is further formed with a governor pressure port 510; first, second and third line pressure inlet ports 512, 514 and 516; first and second line pressure outlet ports 518 and 520; a throttle pressure port 522; a single kickdown port 524; and first and second, third and fourth drain ports 526, 528, 530 and 532. The governor pressure port 510 is open adjacent to the internal wall surface 506 at one axial end of the valve chamber 504, and the fourth drain port 532 is open adjacent to the internal wall surface 508 at the other axial end of the valve chamber 504. The first, second and third line pressure inlet ports 512, 514 and 516 are arranged at distances which are greater in this sequence from the governor pressure port 510 as shown. The first and second line pressure outlet ports 518 and 520 are located axially intermediate between and respectively closer to the first and second line pressure ports 512 and 514. The throttle pressure port 522 is located axially intermediate between the second and third line pressure inlet ports 514 and 516, while the kickdown port 524 is located axially intermediate between the third line pressure inlet port 516 and the fourth drain port 532. The first drain port 526 is open between the first and second line pressure outlet ports 518 and 520, while the second drain port 528 is open between the third line pressure inlet port 516 and the throttle pressure port 522. The third drain port 530 is open between the third line pressure port 516 and the kickdown port 524, as shown.

Figure 3:
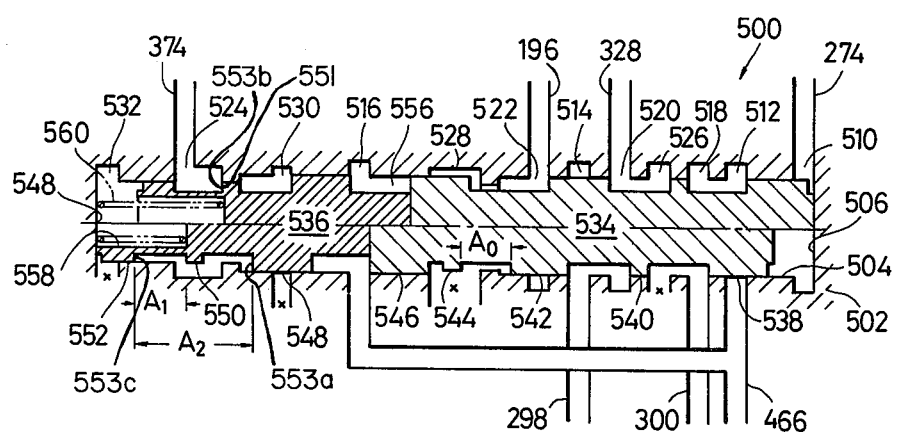
FIG. 3 is a longitudinal sectional view showing, to an enlarged scale, the detailed construction of the transmission gear shift valve included in the hydraulic control system illustrated in FIGS. 2A and 2B.

Within the valve chamber 504 thus formed are mounted first and second valve spools or valve element portions 534 and 536 which are arranged in series with each other and which are axially movable toward and away from the internal wall surface 506 and 508, respectively, of the wall portion 502. The first valve spool 534 is formed with first, second, third, fourth and fifth circumferential lands 538, 540, 542, 544 and 546 which are arranged in this sequence away from one internal wall surface 506 of the wall portion 502, while the second valve spool 536 is formed with first, second and third circumferential lands 548, 550 and 552 which are arranged in this sequence toward the other internal wall surface 508 as shown. Land 550 engages wall 551 of the valve as shown in FIG. 3. The second valve spool 536 is further formed with an axial extension projecting from the first circumferential land 548 of the valve spool 536 toward the outer end face of the fifth circumferential land 546 of the first valve spool 534. The individual lands 538, 540, 542, 544 and 546 of the first valve spool 534 are axially spaced apart from each other so that a circumferential groove is formed between every axially adjacent two of the lands. The groove between the first and second circumferential lands 538 and 540 and the groove between the second and third circumferential lands 540 and 542 of the valve spool 534 are constantly open to the first and second line pressure outlet ports 518 and 520, respectively, irrespective of the axial position of the valve spool 534 within the valve chamber 504 and are permitted to be open respectively to the first line pressure inlet port 512 or the first drain port 526 and the second line pressure inlet port 514 or the first drain port 526 depending upon the axial position of the valve spool 534 within the valve chamber 504. The groove between the third and fourth circumferential lands 542 and 544 of the valve spool 534 is open to the throttle pressure port 522 or the second drain port 528 depending upon the axial position of the valve spool 534 within the valve chamber 504, while the groove between the fourth and fifth circumferential lands 544 and 546 of the valve spool 534 is constantly open to the second drain port 528 without respect to the axial position of the valve spool 534 within the valve chamber 504. The first, second and third circumferential lands 548, 550 and 552 of the second valve spool 536 have axial dimensions and are likewise axially spaced apart from each other and thus form a circumferential groove between the first and second circumferential lands 548 and 550 and a circumferential groove between the second and third circumferential lands 550 and 552. As will be seen in FIG. 3, the grooves on either side of land 550 define spaced surfaces 553a, 553b and 553c. It will be apparent from FIG. 3 that kickdown pressure port 524 also has an axial dimension and that the axial dimension of the land 550 is less than the axial dimension of the kickdown pressure port. The groove between the first and second circumferential lands 548 and 550 of the second valve spool 536 is open to the kickdown port 524 or the third drain port 530 depending upon the axial position of the valve spool 536 within the valve chamber 504, while the groove between the second and third circumferential lands 550 and 552 of the valve spool 536 is constantly open to the kickdown port 524 irrespective of the axial position of the valve spool 536 within the valve chamber 504. When the first and second valve spools 534 and 536 are axially held together with the axial extension 554 of the second valve spool 536 bearing at its outer end against the outer end face of the fifth circumferential lands 546 of the first valve spool 534 as shown, there is an additional circumferential groove 556 formed between the fifth circumferential lands 546 of the first valve spool 534 and the first circumferential land 548 of the second valve spool 536. Such an additional circumferential groove 556 is constantly open to the third line pressure inlet port 516 without respect to the respective axial positions of the valve spools 534 and 536 axially held together within the valve chamber 504.

The first valve spool 534 is thus axially movable within the valve chamber 504 between a first axial position providing communication between the first line pressure inlet and outlet ports 512 and 518 through the groove between the first and second circumferential lands 538 and 540 and communication between the second line pressure outlet port 520 and the first drain port 526 through the groove between the second and third circumferential lands 540 and 542 as indicated by the upper half of the valve spool 534 in FIG. 3, and a second axial position providing communication between the first line pressure outlet port 518 and the first drain port 526 through the groove between the first and second circumferential lands 538 and 540 and communication between the second line pressure inlet and outlet ports 514 and 520 through the groove between the second and third circumferential lands 540 and 542 as indicated by the lower half of the valve spool 534 in FIG. 3. When the valve spool 534 is in the first axial position thereof, the second line pressure inlet port 514 is closed by the third circumferential land 542 and the throttle pressure port 522 is open to the groove between the third and fourth circumferential lands 542 and 544 of the valve spool 534 and, when the valve spool 534 is in the second axial position thereof, the throttle pressure port 522 is closed by the third circumferential land 542 and the groove between the third and fourth circumferential lands 542 and 544 is open to the second drain port 528. On the other hand, the second valve spool 536 is axially movable within the valve chamber 504 between a first axial position in which the groove between the first and second circumferential lands 548 and 550 is open to the third drain port 530 as indicated by the upper half of the valve spool 536, and a second axial position closing the third drain port 530 by the first circumferential land 548 thereof as indicated by the lower half of the valve spool 536. When the second valve spool 536 is in the second axial position thereof, the second circumferential land 550 of the valve spool 536 is exposed in its entirety to the kickdown port 524 so that both of the grooves between the first, second and third circumferential lands 548, 550 and 552 of the valve spool 536 are open to the kickdown port 524. It will be apparent from FIG. 3 that in this position land 550 registers with kickdown pressure port 524 without blocking communication with surfaces 553a and 553c on either side of land 550. The first valve spool 534 bears at the outer axial end of the first circumferential land 538 thereof against one internal wall surface 506 of the wall portion 502 when the valve spool 534 is in the first axial position thereof and, likewise, the second valve spool 536 bears at the outer axial end of the third circumferential land 552 thereof against the other internal wall surface 508 of the wall portion 502 when the valve spool 536 is in the second axial position thereof. When the first and second valve spools 534 and 536 are held in their respective first and second axial positions thus bearing against the internal wall surfaces 506 and 508, respectively, of the wall portion 502, the valve spools 534 and 536 are axially spaced apart from each other and form an intermediate space between the respective outer end faces of the fifth and first circumferential lands 546 and 548 of the valve spools 534 and 536. That is, spools 534 and 536 are not affixed to each other and each has the ability to selectively move without the other moving.

The circumferential lands 538, 540, 542, 544 and 546 of the first valve spool 534 are dimensioned so that the first, second, third and fifth circumferential lands 538, 540, 542 and 546 have substantially equal cross sectional areas and the fourth circumferential land 544 has a cross sectional area smaller than these four circumferential lands 538, 540, 542 and 546. Between the third and fourth circumferential lands 542 and 544 of the first valve spool 534 is thus formed a differential pressure acting area which is effective to urge the valve spool 534 to stay in or move toward the first axial position thereof in the presence of a fluid pressure between the third and fourth circumferential lands 542 and 544, the differential pressure acting area being denoted by $A_O$. On the other hand, the circumferential land 548, 550 and 552 of the second valve spool 536 are sized in such a manner that the first circumferential land 548 has a cross sectional area substantially equal to those of the first, second, third and fourth circumferential lands 538, 540, 542 and 546 of the first valve spool 534 and that the second circumferential land 550 and thus its surface 553b is smaller and larger in cross sectional area than the first and third circumferential lands 548 and 552 and thus their surfaces 553a and 553c, respectively, of the second valve spool 536. Thus, the second valve spool 536 has a first differential pressure acting area (denoted by $A_1$) between surfaces 553a and 553c of the second and third circumferential lands 550 and 552 and a second differential pressure acting area (denoted by $A_2$) between surfaces 553b and 553c of the first and third circumferential lands 548 and 552. The first differential pressure acting area $A_1$ of the second valve spool 536 is effective to urge the valve spool 536 to stay in or move toward the first axial position thereof in the presence of a fluid pressure between the second and third circumferential lands 550 and 552 of the valve spool 536 and, likewise, the second differential pressure acting area $A_2$ is effective to urge the valve spool 536 to stay in or move toward the first axial position thereof in the presence of a fluid pressure concurrently in both of the grooves between the first, second and third circumferential lands 548, 550 and 552 of the valve spool 536. It is apparent that the second differential pressure acting area $A_2$ is larger than the first differential pressure acting area $A_1$ by a value corresponding to a differential pressure acting area formed between the first and second circumferential lands 548 and 550 of the valve spool 536. The second valve spool 536 is further formed with an axial blind bore 558 which is open at the outer axial end of the third circumferential land 552 thereof and a preloaded helical compression spring 560 is seated at one end on an internal end face at the inner axial end of this blind bore 558 and at the other end on the internal wall surface 508 of the wall portion 502. The second and accordingly first valve spools 536 and 534 are thus urged to stay in or move toward their respective first axial positions by means of this spring 560.

As shown in FIG. 2B, the second line pressure inlet port 514 of the first-second gear shift valve 500 is constantly open to a forward drive clutch actuating fluid circuit 298 leading to the fluid chamber of the forward drive clutch 42, while the first line pressure outlet port 518 of the shift valve 500 is constantly open to a low-and-reverse clutch actuating fluid circuit 300 leading on the one hand to the fluid chamber of the low-and-reverse clutch 68 and on the other hand to the second line pressure inlet port 204 of the throttle back-up valve 198. The governor pressure port 510 and the throttle pressure port 522 of the first-second gear shift valve 500 are in constant communication with the governor and throttle pressure circuits 274 and 196, respectively.

In the hydraulic transmission control system incorporating the first-second gear shift valve 500 thus constructed and arranged is further provided a second-gear lock valve 316 to cooperate with the shift valve 500 for the purpose of holding the brake band 72 applied when the manual forward drive range "2" is selected. The second-gear position lock valve 316 comprises an elongated valve chamber 318 formed in the transmission control valve body. The valve chamber 318 has a control port 320, first and second line pressure inlet ports 322 and 324, and a line pressure outlet port 326. The control port 320 is open at an open axial end of the valve chamber 318, and the second line pressure inlet port 324 is open adjacent to the other axial end of the valve chamber 318. The first line pressure inlet port 322 and the line pressure outlet port 326 are located intermediate between and respectively closer to these ports 320 and 324 as shown. The first line pressure inlet port 322 is in communication with the second line pressure outlet port 520 of the above described first-second gear shift valve 276 through a fluid passageway 328. The line pressure outlet port 326 of the second-gear position lock valve 316 is in constant communication with the brake-apply fluid chamber 76 of the band servo unit 74 of the brake band 72 through a band actuating fluid circuit 330.

Within the valve chamber 318 thus formed is mounted a valve spool 332 which is axially slidable in the valve chamber 318 and which has first, second and third circumferential lands 334, 336 and 338 arranged in this sequence away from the first control 320. The lands 334, 336 and 338 of the valve spool 332 are axially spaced apart from each other and thus form circumferential grooves therebetween. The groove between the first and second circumferential lands 334 and 336 is constantly open to the line pressure outlet 326 irrespective of the axial position of the valve spool 332 and is permitted to be open to the line pressure outlet port 326 depending upon the axial position of the valve spool 332 within the valve chamber 318. On the other hand, the groove between the second and third circumferential lands 336 and 338 is constantly open to the second line pressure inlet port 324 irrespective of the axial position of the valve spool 332 within the valve chamber 318 and is permitted to be open to the line pressure outlet port 326 depending upon the axial position of the valve spool 332 within the valve chamber 318. The valve spool 332 is thus movable within the valve chamber 318 between a first axial position providing communication between the first line pressure inlet port 322 and the line pressure outlet port 326 through the groove between the first and second circumferential lands 334 and 336 and having the groove between the second and third circumferential lands 336 and 338 open to the second line pressure inlet port 324 but isolated from the line pressure outlet port 326 as indicated by the right half of the valve spool 332, and a second axial position providing communication between the second line pressure inlet port 324 and the line pressure outlet port 326 through the groove between the second and third circumferential lands 336 and 338 and having the groove between the first and second circumferential lands 334 and 336 open to the first line pressure inlet port 322 but isolated from the line pressure outlet port 326 as indicated by the left half of the valve spool 332. The valve spool 332 is urged to move within the valve chamber 318 toward the first axial position thereof by means of a preloaded helical compression spring 340 which is shown seated at one end on a wall surface at one axial end of the valve chamber 318 and at the other end thereof on an internal end face formed in the valve spool 332. The first and second circumferential lands 334 and 336 of the valve spool 332 are substantially equal in cross sectional area to each other-but are larger in cross sectional area than the third circumferential land 338 so that there is a differential pressure acting area formed between the second and third circumferential lands 336 and 338 of the valve spool 332.

In each of the ports 320, 322, 324 and 326 thus arranged of the second-gear position lock valve 316 is to be developed a line pressure Pl under predetermined conditions. In the absence of a fluid pressure in each of these ports 320, 322, 324 and 326, particularly in the second line pressure inlet port 324, the valve spool 326 is held in the first axial position thereof by the force of the spring 340. When there is a line pressure developed in the second line pressure inlet port 324 in the absence of a fluid pressure in the control port 320, the force of the spring 340 urging the valve spool 332 to move toward the first axial position thereof is overcome by the force resulting from the line pressure acting on the differential pressure acting area between the second and third circumferential lands 336 and 338 of the valve spool 332 and allows the valve spool 332 to move into the second axial position thereof. When the valve spool 332 is thus moved into the second axial position thereof, communication is provided between the first line pressure inlet port 322 and the line pressure outlet port 326 so that, if there is a line pressure developed in the first line pressure inlet port 322 under this condition, the line pressure is passed over to the band actuating fluid circuit 330 through the line pressure outlet port 326 of the second-gear position lock valve 316. Under conditions in which the line pressure is developed in the control port 320 as well as the second line pressure inlet port 324, the force urging the valve spool 332 to move toward the second axial position thereof is opposed not only by the force of the spring 340 but by the force resulting from the line pressure thus developed in the control port 320 and is therefore overcome by the sum of the opposing forces. The valve spool 332 is now moved back from the second axial position into the first axial position thereof and provides communication between the first line pressure inlet port 322 and the line pressure outlet port 326. If, under these conditions, the line pressure is present in the second line pressure outlet port 520 of the first-second gear shift valve 500 as previously described, the line pressure is directed through the fluid passageway 328 to the first line pressure inlet port 322 of the first-gear position lock valve 316 and is passed through the line pressure outlet port 326 of the lock valve 316 to the band actuating fluid circuit 330.

The transmission gear shift valves of the hydraulic control system embodying the present invention further comprise a second-third gear shift valve 342 which is arranged in series with a pressure modulator valve 344 cooperative with the gear shift valve 342. The second-third gear shift valve 342 and the pressure modulator valve 344 are provided in a common elongated valve chamber 346 which is formed in the previously mentioned transmission control valve body and which is closed at both axial ends. The valve chamber 346 has for the second-third gear shift valve 342 a governor pressure port 348, first and second line pressure inlet ports 350 and 352, a line pressure outlet port 354, a second-gear holding port 356, and a downshift port 358 and, for the pressure modulator valve 344, a throttle pressure inlet port 360, first and second throttle pressure relief ports 362 and 364, and a control port 366. The governor pressure port 348 for the second-third gear shift valve 342 is located adjacent to one closed axial end of the valve chamber 346 and the throttle pressure inlet port 360 for the pressure modulator valve 344 is located adjacent to the other closed axial end of the valve chamber 346. The second-gear holding port 356 and the first and second line pressure inlet ports 350 and 352 are arranged in this sequence away from the governor pressure ports 348 with the line pressure outlet port 354 located intermediate between the line pressure inlet ports 350 and 352 and with the downshift port 358 located intermediate between the second-gear holding port 356 and the governor pressure port 348 as shown. The first throttle pressure relief port 362 for the pressure modulator valve 344 is located between the throttle pressure inlet port 360 and the control port 366 for the pressure modulator valve 344, while the second throttle pressure relief port 364 is located axially between the control port 366 for the pressure modulator valve 344 and the second line pressure inlet port 352 for the second-third gear shift valve 342. The governor pressure port 348 for the second-third gear shift valve 342 is in constant communication with the previously described governor pressure circuit 274. The first line pressure inlet port 350 of the second-third gear shift valve 342 is in constant communication through a fluid circuit 368 with the line pressure port 150 of the line pressure booster valve 146. The line pressure outlet port 354 of the second-third gear shift valve 342 is in constant communication with the brake-release fluid chamber 76' of the band servo unit 74 through a band releasing and high-and-reverse clutch actuating fluid circuit 370 having an orifice 372 incorporated therein. The orifice 372 is located in the fluid circuit 370 so that a flow of fluid directed toward or away from the fluid chamber of the high-and-reverse clutch 40 is passed through the orifice 372 but a flow of fluid to be directed toward or away from the brake-release fluid chamber 76' of the band servo unit 74 is not passed through the orifice 372 as will be described in more detail. On the other hand, the throttle pressure port 360 of the pressure modulator valve 344 is in constant communication with the throttle pressure circuit 196 leading from the port 168 of the previously described transmission throttle valve 160. The first and second throttle pressure relief ports 362 and 364 of the pressure modulator valve 344 are in communication with each other through a fluid circuit 375. The control port 366 is in constant communication with the kickdown port 524 of the first-second gear shift valve 500 through a kickdown fluid circuit 374.

Within the valve chamber 346 thus formed is slidably mounted a valve spool 376 which forms part of the second-third gear shift valve 342 and which is axially movable in the valve chamber 346. The valve spool 376 is formed with first, second, third and fourth circumferential lands 378, 380, 382 and 384 which are arranged in this sequence away from the governor pressure port 348. The lands 378, 380, 382 and 384 are axially spaced apart from each other with the first and fourth circumferential lands 378 and 384 located at the opposite axial ends of the spool 376 and have a circumferential groove formed between every adjacent two of the lands. The groove between the first and second circumferential lands 378 and 380 is constantly open to the drain port 358 irrespective of the axial position of the valve spool 376 within the valve chamber 346. The groove between the second and third circumferential lands 380 and 382 is open to the first line pressure inlet port 350 or the second-gear holding port 356 depending upon the axial position of the valve spool 376 within the valve chamber 346. The groove between the third and fourth circumferential lands 382 and 384 is open to both of the first line pressure inlet port 350 and the line pressure outlet port 354 or to both of the second line pressure inlet port 352 and the line pressure outlet port 354 depending upon the axial position of the valve spool 376 within the valve chamber 346. The valve spool 376 of the second-third gear shift valve 342 is, thus, movable within the valve chamber 346 between a first axial position having the groove between the second and third circumferential lands 380 and 382 open to the second-gear holding port 356 and providing communication between the first line pressure inlet port 350 and the line pressure outlet port 354 through the groove between the third and fourth circumferential lands 382 and 384 as indicated by the lower half of the valve spool 376, and a second axial position having the groove between the second and third circumferential lands 380 and 382 open to the second-gear holding port 356 and providing communication between the second line pressure inlet port 352 and the line pressure outlet port 354 through the groove between the third and fourth circumferential lands 382 and 384 of the valve spool 376 as indicated by the upper half of the valve spool 376. The second-gear holding port 356 is closed by the second circumferential land 380 of the valve spool 376 when the valve spool 376 is in the second axial position thereof, and the second line pressure inlet port 352 is closed by the fourth circumferential land 384 when the valve spool 376 is in the first axial position thereof. The first, second and third circumferential lands 378, 380 and 382 are larger in cross section in this sequence and the fourth circumferential land 384 is substantially equal in cross section to the third circumferential land 382, as shown. A differential pressure acting area is thus formed between the second and third circumferential lands 380 and 382. A differential pressure acting area is also provided between the first and second circumferential lands 378 and 380 but such an area is not acted upon by a fluid pressure because the groove between the lands 378 and 380 is constantly open to the drain port 358 as above noted. The fourth circumferential land 384 of the valve spool 376 is formed with a bore which is open at the outer axial end of the land 384 and closed by an internal end face in the land 384.

On the other hand, the pressure modulator valve 344 comprises a valve plunger 386 which is axially slidable within the valve chamber 346 and which has one axial end adjacent to the throttle pressure inlet port 360. The valve plunger 386 has an outer axial extension 388 axially projecting opposite to the valve spool 376 of the second-third gear shift valve 342 and an inner axial extension 390 axially projecting into the above mentioned bore in the fourth circumferential land 384 of the valve spool 376 of the second-third gear shift valve 342. The outer axial extension 388 of the valve plunger 386 is engageable at its leading end with a closed wall surface of the valve chamber 346 adjacent to the throttle pressure inlet port 360 for the pressure modulator valve 344, while the inner axial extension 390 of the valve plunger 386 is engageable at its leading end with the internal end face in the fourth circumferential land 384 of the second-third gear shift valve spool 376. The valve plunger 386 thus formed with the outer and inner axial extensions 388 and 390 has axially outer and inner circumferential edges. The valve plunger 386 thus constructed is axially movable within the valve chamber 346 between a limit axial position having the outer axial extension 388 bearing at its leading end against the above mentioned closed end wall surface of the valve chamber 346 as indicated by the upper half of the valve plunger 386, and an equilibrium axial position displaced a certain distance away from the closed end wall surface of the valve chamber 346 as indicated by the lower half of the valve plunger 386. The valve plunger 386, the first throttle pressure relief port 362 and the control port 366 of the pressure modulator valve 344 are arranged so that, when the valve plunger 386 is in the above mentioned equilibrium axial position thereof, there are established along the axially outer and inner circumferential edges of the valve spool 386 a slight clearance between the throttle pressure inlet port 360 and the first throttle pressure relief port 362 and a clearance between the control port 366 and the space between the valve plunger 386 and the valve spool 376 of the second-third gear shift valve 342.

The valve spool 376 of the second-third gear shift valve 342 and the valve plunger 386 of the pressure modulator valve 344 thus constructed and arranged are urged to be axially spaced apart from each other within the valve chamber 346 by means of a preloaded helical compression spring 392 which is seated at one end on the internal end face within the fourth land 384 of the valve spool 376 and at the other end of the annular face of the valve plunger 386 forming the above mentioned axially inner circumferential edge.

In order to cope with kickdown conditions which are to be brought about when the accelerator pedal is fully depressed, the hydraulic control system shown in FIGS. 2A and 2B further comprises a solenoid operated kickdown valve 394 comprising an elongated valve chamber 396 which is formed in the body structure of the transmission control valve assembly. The valve chamber 396 is closed at one axial end and closed at the other and has first, second and third line pressure ports 398, 400 and 402 arranged in this sequence away from the open axial end of the valve chamber 396 as shown. The second line pressure port 400 is in constant communication with the kickdown fluid circuit 374 leading to the kickdown port 524 of the first-second gear shift valve 500 and the control port 366 of the above described pressure modulator valve 344. The third line pressure port 402 of the kickdown valve 394 is in constant communication with the line pressure circuit 130. The valve chamber 396 thus formed has accommodated therewithin a valve spool 404 which is axially alidable in the valve chamber 396. The valve spool 404 is formed with first and second lands 406 and 408 which are axially spaced apart from each other to form therebetween a circumferential groove which is constantly open to the second line pressure port 400 irrespective of the axial position of the valve spool 404 within the valve chamber 396. The valve spool 404 is axially movable within the valve chamber 396 between a first axial position spaced apart from the closed axial end of the valve chamber 396 and a second axial position close to the closed axial end of the valve chamber 396. When the valve spool 404 is in the first axial position thereof, communication is provided between the first and second line pressure port 398 and 400 through the groove between the lands 406 and 408 of the valve spool 404 and closing the third line pressure port 402 by the second circumferential land 408 as indicated by the right half of the valve spool 404. When the valve spool 404 is in the second axial position, communication is provided between the second and third line pressure ports 400 and 402 through the groove between the lands 406 and 408 of the valve spool 404 and the first line pressure port 398 is closed by the first circumferential land 406 as indicated by the left half of the valve spool 404. The valve spool 404 is urged to move toward the first axial position thereof by means of a preloaded helical compression spring 410 which is shown seated at one end of a wall surface defining the closed axial end of the valve chamber 396 and at the other end on an internal end face formed in the second circumferential land 408 of the valve spool 404. The valve spool 404 thus constructed and arranged is connected to an actuating plunger 412 which axially projects out of the transmission control valve body through the open axial end of the valve chamber 396 and which is connected to or integral with a ferromagnetic core of a solenoid unit (not shown) mounted on the transmission case. Though not shown in the drawings, the solenoid unit has a coil connected to a d.c. power source across a normally open switch which is located in conjunction with the accelerator pedal of the vehicle and which is arranged in such a manner as to close when the accelerator pedal is depressed throughout its full distance of stroke, as is well known in the art.

When the switch for the solenoid unit thus arranged is open and as a consequence the solenoid unit remains inoperative, the valve spool 404 of the kickdown valve 394 is held in the first axial position thereof and provides communication between the first and second line pressure ports 398 and 400. If a fluid pressure is developed in the first line pressure port 398, the fluid pressure is passed from the first line pressure port 398 to the second line pressure port 400 and is directed to the kickdown port 524 of the first-second gear shift valve 500 and the control port 366 of the pressure modulator valve 344 through the fluid circuit 374. When the transmission gear shift lever is in the automatic forward drive range position "D", however, the first line pressure port 398 of the kickdown valve 394 is drained off so that there obtains no fluid pressure in each of the kickdown and control ports 524 and 366 of the first-second gear shift and pressure modulator valves 500 and 342, respectively.

The line pressure Pl developed by the pressure regulator valve 94 is distributed selectively to the various control valves hereinbefore described and to the fluid chambers of the transmission clutches and brakes through a manually operated transmission gear position selector valve 414. The gear position selector valve 414 is provided in an elongated valve chamber 416 which is formed in a wall portion 418 of the transmission control valve body and which is open at both axial ends thereof. The wall portion 418 of the transmission control valve body is further formed with a line pressure inlet port 420; first, second, third, fourth, fifth and sixth line pressure outlet ports 422, 424, 426, 428, 430 and 432; first and second bypass ports 434 and 436; and first, second and third drain ports 438, 440 and 442. The pressure inlet port 420 is in constant communication with the line pressure circuit 130, and the drain ports 438, 440 and 442 are open to the transmission oil reservoir 90. The first and second bypass ports 434 and 436 are in constant communication with each other through a bypass passageway 444. The first and third drain ports 438 and 442 are located adjacent to the opposite axial ends, respectively, of the valve chamber 416 and the first to fifth line pressure outlet ports 422, 424, 426, 428 and 430 are arranged in this sequence away from the first drain port 422 toward the third drain port 442 as shown. The first and second bypass ports 434 and 436 are located between the fifth line pressure outlet port 430 and the third drain port 442 with the second drain port 440 located between the bypass ports 434 and 436. The sixth line pressure outlet port 432 is located substantially aligned with the second bypass port 436 which is located between the second and third drain ports 440 and 442. The line pressure inlet port 420 is located between the fifth line pressure outlet port 430 and the first bypass port 434.

A valve spool 446 has a yoke 448 engaged by the transmission gear shift lever through a suitable mechanical linkage (not shown) and is formed with first, second, third and fourth circumferential lands 450, 452, 454 and 456 which are shown to be arranged in this sequence rightwardly of the yoke 448 shown formed at the left axial end of the valve spool 446. The yoke 448 and the circumferential lands 450, 452, 454 and 456 are axially spaced apart from each other and thus form a circumferential groove between every adjacent two of them. The valve spool 446 thus configured is axially movable through the valve chamber 416 between a parking gear position "P", a reverse drive gear position "R", a neutral gear position "N", an automatic forward drive range position "D", a manual second forward drive range position "2" and a manual first forward drive range position "1" which correspond to their respective counterpart positions of the transmission gear shift lever. When the valve spool 446 of the transmission gear selector valve 414 thus constructed and arranged is in the parking gear position "P", the first, second and third line pressure outlet ports 422, 424 and 426 are open to the first drain port 438 through the groove between the yoke 448 and the first circumferential land 450 of the valve spool 446; the fourth and fifth pressure outlet ports 428 and 430 are in communication with the line pressure inlet port 420 through the groove between the second and third circumferential lands 452 and 454 of the valve spool 446; the first bypass port 434 is closed by the third circumferential land 454 of the valve spool 446; and the sixth line pressure outlet port 432 is open to the second drain port 440 through the groove between the third and fourth circumferential lands 454 and 456 and to the third drain port 442 past the fourth circumferential land 456 of the valve spool 446. When the valve spool 446 is in the reverse drive gear position "R", the first, second and third line pressure outlet ports 422, 424 and 426 are open to the first drain port 438 through the groove between the yoke 448 and the first circumferential land 450 of the valve spool 446; the fourth and fifth line pressure outlet ports 428 and 430 and the first bypass port 434 are in communication with the line pressure inlet port 420 through the groove between the second and third circumferential lands 452 and 424; and second and third drain ports 440 and 442 are closed by the third and fourth circumferential lands 454 and 456, respectively, of the valve spool 446; and the sixth line pressure outlet port 432 and the second bypass port 436 are open to each other through the groove between the third and fourth circumferential lands 454 and 456 of the valve spool 446 so that the sixth line pressure outlet port 432 is in communication with the line pressure inlet port 420 through the bypass passageway 444 joining the first and second bypass ports 434 and 436. When the valve spool 446 is in the neutral gear position "N", the first, second and third line pressure outlet ports 422, 424 and 426 are open to the first drain port 438; the fourth and fifth line pressure outlet ports 428 and 430 and the first bypass port 434 are in communication with the line pressure inlet port 420 through the groove between the second and third circumferential lands 452 and 454 of the valve spool 446; the second bypass port 436 and the second drain port 440 are closed by the third circumferential land 454 of the valve spool 446; and the sixth line pressure outlet port 432 is open to the third drain port 442 through the groove between the third and fourth circumferential lands 454 and 456 of the valve spool 446 as shown in FIG. 2B. When the valve spool 446 is in the automatic forward drive range position "D", the first drain port 438 is closed by the first circumferential land 450 of the valve spool 446; the first, second and third line pressure outlet ports 422, 424 and 426 are in communication with the line pressure inlet port 420 through the groove between the first and second circumferential lands 450 and 452 of the valve spool 446; the fourth, fifth and sixth line pressure outlet ports 428, 430 and 432 and the first bypass port 434 are open to the second drain port 440; and the second bypass port 436 and the third drain port 442 are closed by the fourth circumferential land 456 of the valve spool 446. When the valve spool 446 is in the manual second foward drive range position "2", the first drain port 438 and the first line pressure outlet port 422 are in communication with each other through the groove between the yoke 448 and the first circumferential land 450 of the valve spool but isolated from the line pressure inlet port 420 by the first circumferential land 450 of the valve spool 446; the second, third and fourth line pressure outlet ports 424, 426 and 428 are in communication with the line pressure inlet port 420 through the groove between the first and second circumferential lands 450 and 452 of the valve spool 446; and fifth and sixth line pressure ports 430 and 432 and the first and second bypass ports 434 and 436 are open to the second drain port 440 through the groove between the second and third circumferential lands 454 and 456 of the valve spool 446; and the third drain port 442 is closed by the third circumferential land 454 of the valve spool 446. When the valve spool 446 is in the manual first forward drive range position "1", the first and second line pressure outlet ports 422 and 424 are open to the first drain port 438 through the groove between the yoke 448 and the first circumferential land 450 of the valve spool 446 but are isolated from the line pressure inlet port 420 by the first circumferential land 450 of the valve spool 446; the third, fourth and fifth line pressure outlet ports 426, 428 and 430 are in communication with the line pressure inlet port 420 through the groove between the first and second circumferential lands 450 and 452 of the valve spool 446; the first bypass port 434 is closed by the second circumferential land 452 of the valve spool 446; and the sixth line pressure outlet port 432 and the second bypass port 436 are open to the second and third drain ports 440 and 442 through the groove between the second and third circumferential lands 452 and 454 of the valve spool 446.

Thus, the first line pressure outlet port 422 is open to the line pressure inlet port 420 only when the valve spool 446 is in the automatic forward drive range position "D", and is in communication with the control port 320 of the second-gear position lock valve 316 and further with the second line pressure inlet port 352 and accordingly the second-gear holding port 356 of the second-third gear shift valve 342 through a fluid circuit 458. The second line pressure outlet port 424 of the gear position selector valve 414 is open to the line pressure inlet port 420 of the valve 414 when the valve spool 446 of the selector valve 414 is either in the automatic forward drive range position "D" or in the manual second forward drive range position "2", and is in communication with the second line pressure inlet port 324 of the second-gear position lock valve 316 through a fluid passageway 460. The third line pressure outlet port 426 is open to the line pressure inlet port 420 when the valve spool 446 is in any one of the automatic and manual forward drive range positions "D", "2" and "1", and is in communication with the clutch actuating fluid circuit 298 and through a fluid passageway 462 with the fluid inlet port 258 of the secondary governor valve 86' of the transmission governor assembly 84. The fourth line pressure outlet port 428 is open to the line pressure inlet port 420 when the valve spool 446 is in any one of the positions except for the automatic forward drive range "D", and is in communication with the second line pressure inlet port 204 of the throttle back-up valve 198 and the first line pressure port 398 of the solenoid operated kickdown valve 394 through a fluid circuit 464. The fifth line pressure outlet port 430 is open to the line pressure inlet port 420 when the valve spool 446 is in any one of the parking gear position "P", reverse drive gear position "R", neutral gear position "N" and manual first forward drive range "1", and is in communication with the first and third line pressure inlet ports 512 and 516 of the first-second gear shift valve 500 through a fluid circuit 466. The sixth line pressure outlet port 432 is open to the line pressure inlet port 420 only when the valve spool 446 is in the reverse drive gear position "R", and is in communication with the line pressure port 150 of the line pressure booster valve 146 and the second line pressure port 352 of the second-third gear shift valve 342 through the fluid circuit 368. The fluid circuit 458 leading from the first line pressure outlet port 422 of the gear position selector valve 414 to the second line pressure inlet port 352 and the second-gear holding port 356 of the second-third gear shift valve 342 is provided with an orifice check valve 468 for restricting the flow rate of fluid to be passed from the gear position selector valve 414 to the ports 352 and 356 of the second-third gear shift valve 342 and allow fluid to be discharged from the ports 352 and 356 back to the gear position selector valve 414 without being subjected to any flow restriction therethrough.

The hydraulic transmission control system shown in FIGS. 2A and 2B further comprises a second-third gearshift timing valve 472 which is adapted to retard the timings with which the high-and-reverse clutch 40 is to be coupled and uncoupled as compared with the timings at which the brake band 72 is to be released and applied, respectively, under predetermined conditions in which the vehicle speed is low as compared with the torque output being delivered from the engine during shifting between the third gear ratio in the automatic forward drive range and the second gear ratio in the automatic or manual forward drive range.

The second-third gearshift timing valve 472 comprises an elongated valve chamber 474 formed in the transmission control valve body. The valve chamber 474 has a governor pressure port 476 which is open at one axial end of the valve chamber 474, a throttle pressure port 478 open to the valve chamber 474 at the other end of the valve chamber 474, line pressure inlet and outlet ports 480 and 482 located intermediate between and respectively closer to the governor and throttle pressure ports 476 and 478, and a drain port 484 located between the governor pressure port 476 and the line pressure inlet port 480, as shown. The governor pressure port 476 is in constant communication with the governor pressure circuit 274, and the throttle pressure port 478 is in constant communication with the above mentioned throttle pressure circuit 196. The line pressure inlet port 480 is in constant communication with the previously described band releasing fluid circuit 370 and through a high-and-reverse clutch actuating fluid circuit 486 and a calibrated orifice 488 provided in the passageway 486 with the fluid chamber for the high-and-reverse clutch 40. The line pressure outlet port 482 is in communication with the high-and-reverse clutch actuating fluid circuit 486 without passing through the orifice 488. The valve chamber 474 thus formed has axially slidably mounted therein a valve spool 490 having first, second and third circumferential lands 492, 494 and 496 of which the first and third circumferential lands 492 and 496 are located adjacent to the governor and throttle pressure ports 476 and 478, respectively, the lands 492, 494 and 496 being axially spaced apart from each other for forming a circumferential groove between adjacent two of them. The groove formed between the first and second circumferential lands 492 and 494 is constantly open to the drain port 484 irrespectively of the axial position of the valve spool 490 within the valve chamber 474, while the groove formed between the second and third circumferential lands 494 and 496 is constantly open to the line pressure outlet port 482 irrespectively of the axial position of the valve spool 490 within the valve chamber 474 and is permitted to be open to the line pressure inlet port 480 depending upon the axial position of the valve spool 490 within the valve chamber 474. The valve spool 490 is, thus, axially movable within the valve chamber 474 between a first axial position providing communication between the line pressure inlet and outlet ports 480 and 482 through the groove between the second and third circumferential lands 494 and 496 as indicated by the right half of the valve spool 490, and a second axial position closing the line pressure inlet port 480 by the second circumferential land 494 as indicated by the left half of the valve spool 490. The valve spool 490 is formed with an axial blind bore open toward the throttle pressure port 478 and is urged to move toward the first axial position thereof by means of a preloaded helical compression spring 498 which is shown seated at one end on an internal end face at the bottom of the above mentioned axial blind bore in the valve spool 490 and at the other end on an annular internal end face of the valve chamber 474 adjacent to the throttle pressure port 478. With the second-third gearshift timing valve 472 thus constructed and arranged, the valve spool 490 is permitted to stay in the first axial position thereof when the force resulting from the governor pressure port 476 is overcome by the sum of the force of the spring 498 and the force produced by the throttle pressure Pt to be developed in the throttle pressure port 478. In other words, the valve spool 490 of the gearshift timing valve 472 is held in the first axial position thereof when the vehicle speed at a given instant is relatively low as compared with the opening degree of the carburetor throttle valve at the particular instant with respect to a predetermined relationship between the vehicle speed and the opening degree of the carburetor throttle valve. Such a relationship is dictated by the force of the spring 498 and the ratio between the respective cross sectional areas of the first and third circumferential lands 492 and 494. In the shown arrangement, the first circumferential land 492 of the valve spool 490 is assumed to be smaller in cross sectional area than the third circumferential land 496 which has a cross sectional area substantially equal to that of the second circumferential land 494. As the vehicle speed increases as compared with the opening degree of the carburetor throttle valve and accordingly with the torque output being delivered from the engine, the force resulting from the governor pressure Pg developed in the governor pressure port 476 overcomes the sum of the force of the spring 498 and the force produced by the throttle pressure Pt developed in the throttle pressure port 478 and causes the valve spool 490 to move from the first axial position toward the second axial position thereof, providing communication between the line pressure inlet and outlet ports 480 and 482. Thus, the communication between the line pressure inlet and outlet ports 480 and 482 of the second-third gearshift timing valve 472 is provided when the vehicle speed at a given point of time is at a relatively high level as compared with the opening degree of the carburetor throttle valve at the particular point of time with respect to the above described predetermined relationship between the vehicle speed and the opening degree of the carburetor throttle valve. When communication is provided between the line pressure inlet and outlet ports 480 and 482 of the second-third gearshift timing valve 472, the orifice 488 provided in the high-and-reverse clutch actuating fluid circuit 486 is bypassed by the passageway formed between these ports 480 and 482 so that, if a line pressure fluid is present across this orifice 488, the fluid is permitted to pass through the timing valve 472 without being subjected to the flow restriction by the orifice 488. When the communication between the line pressure inlet and outlet ports 480 and 482 of the gearshift timing valve 472 is blocked, the fluid present across the orifice 488 is caused to flow at a restricted rate therethrough.

Hydraulic Control System—Operation

Throughout the condition in which the engine is in operation delivering power output from the crankshaft thereof, the pressure regulator valve 94 is operative to produce a line pressure Pl in the line pressure circuit 130 and the line pressure Pl thus developed in the circuit 130 is distributed to the line pressure inlet port 420 of the manually operated gear position selector valve 414. The line pressure Pl is also supplied through the line pressure circuit 130 to the transmission throttle valve 160, which is therefore operative to produce a throttle pressure Pt in the throttle pressure circuit 196. The throttle pressure Pt thus deloped in the throttle pressure circuit 196 is distributed to the throttle pressure port 360 of the second-third gear shift valve 342 and to the throttle pressure inlet port 226 of the pressure modifier valve 222. The throttle pressure in the throttle pressure circuit 196 is further directed to the throttle pressure port 148 of the line pressure booster valve 146 and maintains the line pressure Pl at an elevated level.

The line pressure Pl introduced into the line pressure inlet port 420 of the manually operated gear position selector valve 414 is selectively distributed through any one or ones of the line pressure outlet ports 422, 424, 426, 428, 430 and 432 of the selector valve any one or ones of the fluid chambers for the clutches 40 and 42 and the brake 68 and the brake-apply and brake-apply and brake-release fluid chambers 76 and 76' of the band servo unit 74 depending upon the axial position selected of the valve spool 446 of the gear position selector valve 414. As previously described in detail, the valve spool 446 of the gear position selector valve 414 of the hydraulic control system embodying the present invention is adapted to provide communication between the line pressure inlet port 420 and each of the first, second, third, fourth, fifth and sixth line pressure outlet ports 422, 424, 426, 428, 430 and 432 of the valve 414 in accordance with the schedules which are indicated in Table 2 below.

TABLE 2

| Gear Positions | Port 422 | Port 424 | Port 426 | Port 428 | Port 430 | Port 432 |
| --- | --- | --- | --- | --- | --- | --- |
| "P" | x | x | x | o | o | x |
| "R" | x | x | x | o | o | o |
| "N" | x | x | x | o | o | x |
| "D" | o | o | o | x | x | x |
| "2" | x | o | o | o | x | x |
| "1" | x | x | o | o | o | x |

In table 2, the sign "o" indicates that the line pressure outlet port in question is in a condition communicating with the line pressure inlet port 166 so that a line pressure Pl is developed in the particular line pressure outlet port, while the sign "x" indicates that the line pressure outlet port in question is in a condition isolated from the line pressure inlet port 420 by any one or ones of the yoke 448 and the circumferential lands 450, 452, 454 and 456 of the valve spool 446 and drained off through any one or ones of the drain ports 438, 440 and 442.

Under a condition in which the valve spool 446 of the manually operated gear position selector valve 414 is in the neutral gear position "N" as shown in FIG. 2B, the first, second, third and sixth line pressure outlet ports 422, 424, 426 and 432 are drained off and the fourth and fifth line pressure outlet ports 428 and 430 are permitted to communicate with the line pressure inlet port 420 of the selector valve 414. The line pressure thus developed in the fifth line pressure outlet port 430 is directed through the passageway 466 to the first and third line pressure inlet ports 512 and 156 of the first-second gear shift valve 500. In the absence of any fluid pressure in the governor pressure port 510, the first and second valve spools 534 and 536 of the first-second gear shift valve 500 are held in their respective first axial positions thereof by the force of the spring 560, maintaining communication between the first line pressure inlet and outlet ports 512 and 518 of the shift valve 500. The line pressure developed in the first line pressure inlet port 512 of the first-second gear shift valve 500 is therefore passed through the first line pressure inlet and outlet ports 512 and 518 of the valve to the low-and-reverse brake actuating fluid circuit 300 and is directed on the one hand to the fluid chamber of the low-and-reverse brake 68 and on the other hand to the first line pressure inlet port 202 of the throttle back-up valve 198. The line pressure directed to the fluid chamber of the low-and-reverse brake 68 causes the brake 68 to apply, while the line pressure directed to the first line pressure port 202 of the throttle back-up valve 198 is admitted into one end portion of the valve chamber 200 of the valve 198 through the previously described radial and axial passageways in the valve spool 212 and acts on the outer end face of the first circumferential land 214 of the valve spool 212. The valve spool 212 of the throttle back-up valve 198 is therefore moved into the second axial position thereof against the force of the spring 220. On the other hand, the line pressure developed in the fourth line pressure outlet port 428 of the manually operated gear position selector valve 414 is distributed through the fluid circuit 464 to the first line pressure port 398 of the kickdown valve 394 and the second line pressure port 204 of the throttle back-up valve 198. The line pressure thus developed in the second line pressure port 204 of the throttle back-up valve 198 is allowed into the radial and axial passageways in the valve spool 212 of the throttle back-up valve 198 having the valve spool 212 held in the second axial position thereof as above described and maintains the valve spool 212 in the second axial position thereof. The valve spool 212 of the throttle back-up valve 198 being thus held in the second axial position thereof, the throttle back-up pressure port 206 of the valve 198 is open to the drain port 208 so that the throttle valve 160 is operative to develop a throttle pressure in the throttle pressure port 168 thereof is the engine is in operation. On the other hand, the line pressure developed in the first line pressure port 398 of the kickdown valve 394 is passed to the second line pressure port 400 with the valve spool 404 held in the first axial position thereof and is directed through the kickdown fluid circuit 374 to the kickdown port 524 of the first-second gear shift valve 500 and the control port 366 of the pressure modulator valve 344. The line pressure developed in the kickdown port 524 of the first-second gear shift valve 500 acts on the previously mentioned first differential pressure acting area of the second valve spool 536 of the shift valve 500 and reinforces the force of the spring 560 holding the first and second valve spools 534 and 536 of the valve 500 in their respective first axial positions thereof in the absence of a fluid pressure in the governor pressure port 510. The line pressure developed in the control port 366 of the pressure modulator valve 344 acts, in cooperation with the force of the spring 392, on not only the valve plunger 386 of the pressure modulator valve 344 but the valve spool 376 of the second-third gear shift valve 342 so that the valve spool 376 of the second-third gear shift valve 342 and the valve plunger 386 of the pressure modulator valve 344 are axially spaced apart from each other and are accordingly held in their respective first and second axial positions thereof. Thus, the first-second gear shift valve 500 is maintained in the first gear condition thereof and the second-third gear shift valve 342 is maintained in the second gear condition thereof while the low-and-reverse clutch 68 is held in the applied condition thereof when the transmission gear shift lever is in the neutral gear position "N".

When, now, the transmission gear shift lever is moved by the vehicle driver from the neutral gear position "N" to the automatic forward drive range position "D", the valve spool 446 of the manually operated gear position selector valve 414 is moved into the corresponding position providing communication between the line pressure inlet port 420 and each of the first, second and third line pressure outlet ports 422, 424 and 426 with the fourth and fifth line pressure outlet ports 428 and 430 held open to the second drain port 440 of the gear position selector valve 414. The kickdown port 524 of the first-second gear shift valve 500 and the control port 366 of the second-third gear shift valve 342 are therefore drained off through the kickdown fluid circuit 374, the second and first line pressure ports 400 and 398 of the kickdown valve 394, the fluid circuit 464 and the ports 428 and 440 of the gear position selector valve 414. On the other hand, the first line pressure outlet port 518 of the first-second gear shift valve 500 is drained off through the first line pressure inlet port 512 of the shift valve 500, the passageway 466 and the fifth line pressure outlet port 430 and second drain port 440 of the gear position selector valve 414.

The third line pressure inlet port 426 of the manually operated gear position selector valve 414 being now held in communication with the line pressure inlet port 420 of the selector valve 414, the line pressure Pl developed in the line pressure circuit 130 is passed through the forward drive clutch actuating fluid circuit 298 to the fluid chamber for the forward drive clutch 42 and causes the clutch 42 to couple. The driving torque which has been delivered from the torque converter 14 to the transmission input shaft 28 is transmitted via the first and second planeatery gear assemblies 52 and 54 to the transmission output shaft 64 with the one-way clutch 70 held in play in the power transmission mechanism shown in FIG. 1, thereby producing in the transmission mechanism the first or "low" gear ratio ($D_1$) in the automatic forward drive range "D".

The line pressure Pl developed in the forward drive clutch actuating circuit 298 is also directed to the fluid inlet port 258 of the secondary governor valve 86' of the transmission governor assembly 84, which is accordingly made operative to produce in the governor pressure circuit 274 a governor pressure Pg which is continuously variable with vehicle speed. The governor pressure Pg in the circuit 274 is distributed to the respective governor pressure ports 510 and 348 of the first-second and second-third gear shift valves 500 and 342 and urges the valve spools 534 and 536 of the first-second gear shift valve 500 and the valve spool 376 of the second-third gear shift valve 342 to move away from the respective first axial positions thereof. The governor pressure Pg is further directed through the circuit 274 to the governor pressure port 230 of the pressure modifier valve 222 and urges the valve spool 236 of the modifier valve 222 to move away from the first axial position thereof against the force of the spring 242 and the force produced by the throttle pressure Pt acting on the differential pressure acting area between the first and second circumferential lands 238 and 240 of the valve spool 236. The valve spool 236 of the pressure modifier valve 222 is therefore conditioned to stay in an equilibrium axial position between the first and second axial positions thereof as previously described and develops a modified throttle pressure in the modified pressure port 228 thereof. The modified throttle pressure is directed through the fluid passageway 234 to the modified throttle pressure port 108 of the pressure regulator valve 94 and lessens the line pressure Pl depending upon the predetermined relationship between the vehicle speed and the opening degree of the carburetor throttle valve.

When the manually operated gear position selector valve 414 is in the automatic forward drive range position "D", not only the third line pressure outlet port 426 but also the first and second line pressure outlet port 422 and 424 of the gear selector valve 414 are permitted to communicate with the line pressure inlet port 420 of the valve 414 so that the line pressure Pl developed in the line pressure circuit 130 is distributed through the passageways 458 and 460 to the control port 320 and the second line pressure inlet port 324 of the second-gear position lock valve 316 and further through the passageway 458 and the one-way orifice check valve 468 to the second line pressure port 352 and second-gear holding port 356 of the second-third gear shift valve 342. The line pressure developed in the control port 366 of the second-gear lock valve 316 is effective, in cooperation with the force of the spring 340, for holding the valve spool 332 of the lock valve 316 to stay in the first axial position thereof isolating the second line pressure inlet port 324 from the line pressure outlet port 326 of the lock valve 316 against the force resulting from the line pressure acting on the differential pressure acting area between the second and third circumferential lands 336 and 338 of the valve 316 from the line pressure port 324. The line pressure developed in the second-gear holding port 356 of the second-third gear shift valve 342 acts on the differential pressure acting between the second and third circumferential lands 380 and 382 of the valve spool 376 held in the first axial position thereof and urges the valve spool 376 to stay in situ against the force produced by the governor pressure Pg acting on the first circumferential land 378 of the valve spool 376. The force thus produced by the governor pressure Pg in the second-third gear shift valve 342 is opposed not only by the force resulting from the line pressure acting on the differential area between the lands 380 and 382 of the valve spool 376 but by the force of the spring 392 and the force produced by the modulated throttle pressure developed between the valve spool 376 of the gear shift valve 342 and the valve plunger 386 of the pressure modulator valve 344 with the control port 366 of the pressure modulator valve 344 drained off as above described. The line pressure developed in the forward drive clutch actuating circuit 298 is also directed to the second line pressure inlet port 514 of the first-second gear shift valve 500 but is cut off by the third circumferential land 542 of the first valve spool 534 held in the first axial position thereof as indicated by the upper half of the spool 542 in FIG. 3.

As the vehicle speed is increased and exceeds a predetermined value, the force exerted on the end face of the first circumferential land 538 of the first valve spool 534 of the first-second gear shift valve 500 by the governor pressure Pg developed in the governor pressure port 510 of the shift valve 500 overcomes the sum of the force of the spring 560 and the force produced by the throttle pressure acting on the differential pressure acting area $A_o$ between the third and fourth circumferential lands 542 and 544 of the first valve spool 534 and causes the first and second valve spools 534 and 536 to move away from the respective first axial positions thereof. At an instant when the first valve spool 534 thus moving toward the second axial position thereof is moved past an axial position closing the throttle pressure port 522 by the third circumferential land 542 thereof, the force resulting from the throttle pressure acting on the differential pressure acting area $A_o$ between the lands 542 and 544 is eliminated and as a consequence the force resulting from the governor pressure Pg acting on the first circumferential land 538 of the first valve spool 534 is opposed only by the force of the spring 560. Upon reaching the above mentioned axial position, therefore, the first and second valve spools 534 and 536 are allowed to move fast into the respective second axial positions thereof. Communication is now provided between the second line pressure inlet and outlet ports 514 and 520 of the first-second gear shift valve 500 so that the line pressure which has been directed to the second line pressure inlet port 514 is passed through the second line pressure outlet port 520 of the gear shift valve 500 to the first line pressure inlet port 322 of the second-gear position lock valve 316. The second-gear position lock valve 316 is maintained in a condition having the valve spool 332 in the first axial position partly by the force of the spring 340 and partly by the force exerted on the valve spool 332 by the line pressure directed to the control port 320 of the valve 316 from the first line pressure outlet port 422 of the manually operated gear position selector valve 414 as previously noted. Communication being thus established between the first line pressure inlet port 322 and the line pressure outlet port 326 of the second-gear position lock valve 316, the line pressure developed in the first line pressure inlet port 322 of the valve 316 is passed through the line pressure outlet port 326 of the valve 316 to the band actuating fluid circuit 330 and by way of the fluid circuit 330 to the brake-apply fluid chamber 76 of the band servo unit 74. The brake band 72 being now applied with the forward drive clutch 42 kept coupled, a shift is made in the transmission mechanism shown in FIG. 1 from the first gear ratio ($D_1$) to the second gear ratio ($D_2$) in the automatic forward drive range "D".

As the vehicle speed is further increased and reaches a level at which the force exerted on the valve spool 376 of the second-third gear shift valve 342 by the governor pressure Pg acting on the valve spool 376 overcomes the sum of the force of the spring 392, the force resulting from the modulated throttle pressure obtaining between the valve spool 376 and the valve plunger 386 of the pressure modulator valve 344 and the force resulting from the line pressure acting on the differential pressure acting area between the lands 380 and 382 of the valve spool 376 from the second-gear holding port 356 of the second-third gear shift valve 342, the valve spool 376 of the gear shift valve 342 is caused to move away from the first axial position thereof. At an instant the valve spool 376 thus moving toward the second axial position thereof reaches an axial position closing the second-gear holding port 356 by the second circumferential land 380 thereof, the valve spool 376 is liberated from the force which has been exerted thereon by the line pressure in the second-gear holding port 356 and is allowed to move fast into the second axial position thereof against the force of the spring 392 and the force resulting from the modulated throttle pressure acting on the valve spool 376. Fluid communication is now provided between the second line pressure inlet port 352 and the line pressure outlet port 354 of the second-third gear shift valve 342 and allow the line pressure to flow from the second line pressure inlet port 352 to the line pressure outlet port 354 of the gear shift valve 342 and through the port 354 to the band releasing fluid circuit 370 leading to the brake-release fluid chamber 76' of the band servo unit 74. Since, in this instance, the line pressure fluid to be admitted to the second line pressure inlet port 352 is subjected to a flow restriction in the one-way orifice check valve 468 provided in the fluid passageway branched from the fluid passageway 458 leading from the first line pressure outlet port 422 of the manually operated gear position selector valve 414, the fluid in the passageway 458 is allowed to flow at a restricted rate into the second line pressure inlet port 352 of the second-third gear shift valve 342. In the brake-release fluid chamber 76' of the band servo unit 74 is therefore developed a fluid pressure which increases at a relatively low, limited rate at an incipient stage and thereafter at an exponentially increasing rate toward the level of the line pressure $P_l$ with the result that the brake band 72 which has been maintained in the applied condition is caused to release initially at a relatively low, limited rate and thereafter at an exponentially increasing rate until the band 72 is fully released. The fluid pressure thus developed in the band releasing and high-and-reverse clutch actuating fluid circuit 370 is also directed to the fluid chamber of the high-and-reverse clutch 40, which is accordingly caused to couple. The brake band 72 being released and the high-and-reverse clutch 40 being thus coupled with the forward drive clutch 42 still maintained in the coupled condition, there is produced in the transmission mechanism shown in FIG. 1 and upshift from the second gear ratio ($D_2$) to the third gear ratio ($D_3$) in the automatic forward drive range "D". Thus, the second-third gearshift timing valve 472 lends itself to alleviating shocks to be produced when an upshift is to be made between the second and third gear ratios in the transmission mechanism under conditions in which the vehicle speed is relatively high in comparison with the driving torque being delivered from the engine.

When the second-third gear shift valve 342 is in the third gear ratio condition, the valve spool 376 of the gear shift valve 342 is held in the second axial position thereof and accordingly the valve plunger 386 of the pressure modulator valve 344 is held in the previously mentioned limit axial position thereof as indicated by the upper halves of the valve spool and plunger 376 and 386. Under these conditions, the valve spool 376 of the second-third gear shift valve 342 is subjected only to the force produced by the governor pressure Pt in the governor pressure port 348 of the gear shift valve 342 and the force transmitted to the valve spool 376 from the pressure modulator valve plunger 386 which is acted upon by the throttle pressure Pt in the throttle pressure port 360 of the pressure modulator valve 344. If the vehicle speed is reduced and/or the accelerator pedal is depressed to increase the opening degree of the carburetor throttle valve so that the previously described second predetermined relationship is established between these parameters under these conditions, the force produced by the throttle pressure Pt acting on the valve plunger 386 of the pressure modulator valve 344 overcomes the force produced by the governor pressure Pg acting on the valve spool 376 of the second-third gear shift valve 342 and causes the valve spool 376 to move toward the first axial position thereof. At a point of time when the valve spool 376 thus moving toward the first axial position thereof reaches an axial position in which the groove between the first and second circumferential lands 378 and 380 of the valve spool 376 is open to the second-gear holding port 356 of the gear shift valve 342, the valve spool 376 is subjected to an additional force produced by the line pressure acting on the differential pressure acting area between these lands 378 and 380 and is caused to move fast into the first axial position thereof, isolating the line pressure outlet port 354 from the second line pressure inlet port 352 and permitting the former to be open to the first line pressure inlet port 350. When the manually operated gear position selector valve 414 is in the automatic forward drive range position "D", the sixth line pressure outlet port 432 of the selector valve 414 is drained off through the third drain port 442 of the selector valve 414 so that the first line pressure inlet port 350 of the second-third gear shift valve 342 is drained off through the fluid circuit 368 and the sixth line pressure outlet port 432 of the gear position selector valve 414. When communication is provided between the first line pressure inlet port 350 and the line pressure outlet port 354 of the second-third gear shift valve 342 as above described, the line pressure which has been developed in the brake-release fluid chamber 76' of the band servo unit 74 and the fluid pressure which has been developed in the fluid chamber of the high-and-reverse clutch 40 are discharged through the band releasing fluid circuit 370, the ports 354 and 350 of the second-third gear shift valve 342, the fluid circuit 368 and the sixth line pressure outlet port 432 of the manually operated gear position selector valve 414. The fluid pressure being discharged from each of the brake-release fluid chamber 76' of the band servo unit 74 and the fluid chamber of the high-and-reverse clutch 40, the brake band 72 is applied for a second time and the high-and-reverse clutch 40 is uncoupled. With the forward drive clutch 42 kept coupled, a shift is now made in the transmission mechanism from the third gear ratio ($D_3$) to the second gear ratio ($D_2$) in the automatic forward drive range "D". When the second-third gear shift valve 342 restores the second gear ratio condition thereof, a modulated throttle pressure is developed in the pressure modulator valve 344.

If the vehicle further slows down and as a consequence the vehicle speed is reduced to a predetermined value, the force exerted on the first valve spool 534 of the first-second gear shift valve 500 by the governor pressure Pg in the governor pressure port 510 of the shift valve 500 is overcome by the force of the spring 560 with the result that the first and second valve spools 534 and 536 are caused to move from their respective second axial positions back into their first axial positions. In the course of movement from the second axial position to the first axial position of the first valve spool 534, the third circumferential land 542 of the valve spool 534 opens up the throttle pressure port 522 of the shift valve 500 so that the valve spools 534 and 536 are thereafter moved fast into the respective first axial positions thereof by an additional force resulting from the throttle pressure acting on the differential pressure acting area between the third and fourth circumferential lands 542 and 544 of the valve spool 534 from the throttle pressure port 522 of the valve 500. With the first and second valve spool 534 and 536 of the first-second gear shift valve 500 thus returned to the respective first axial positions thereof, the second line pressure outlet port 520 of the shift valve 500 is isolated from the second line pressure port 514 and is permitted to be open to the first drain port 526 of the valve 500. The line pressure which has been developed in the brake-apply fluid chamber 76 of the band servo unit 74 is now discharged through the band actuating fluid circuit 330, past the line pressure outlet port 326 and the first line pressure inlet port 322 of the second-gear position lock valve 316 and by way of the fluid passageway 328 and the second line pressure outlet port 520 and the first drain port 526 of the first-second gear shift valve 500. The brake band 72 being thus released, only the forward drive clutch 42 remains operative in the transmission mechanism shown in FIG. 1 and, in cooperation with the one-way clutch 70, produces in the transmission mechanism shown in FIG. 1 the first gear ratio ($D_1$) in the automatic forward drive range "D".

Under part-throttle condition of the engine, viz., non-kickdown condition of the transmission system, a downshift from the second gear ratio ($D_2$) to the first gear ratio (D) in the automatic forward drive range "D" occurs at a vehicle speed at which the governor pressure Pg acting on the first valve spool 534 of the firstsecond gear shift valve 500 is overcome only by the first of the spring 560 while an upshift from the first gear ratio ($D_1$) to the second gear ratio ($D_2$) in the automatic forward drive range "D" takes place at a vehicle speed at which the governor pressure Pg acting on the first valve spool 534 of the shift valve 500 overcomes not only the force of the spring 560 but further the force resulting from the throttle pressure Pt acting on the differential pressure acting area $A_o$ between the third and fourth circumferential lands 542 and 544 of the valve spool 534. In other words, a downshift between the first and second gear ratios in the automatic forward drive range "D" takes place at a vehicle speed lower than a vehicle speed at which an upshift between these gear ratios takes place under part-throttle operating conditions of the engine. The vehicle speeds at which a downshift and upshift between the first and second gear ratios in the automatic forward drive range "D" are to occur can be varied by varing the differential pressure acting area $A_o$ between the third and fourth circumferential lands 542 and 544 of the first valve spool 534 of the first-second gear shift valve 500.

By manipulating the transmission gear shift lever into the manual second forward drive range position "2", the manually operated gear position selector valve 414 is moved to the corresponding axial position providing communication from the line pressure inlet port 420 to the second, third and fourth line pressure outlet ports 424, 426 and 428 of the selector valve 414 and causing the first line pressure outlet port 422 to be drained off through the first drain port 438 of the valve 414. The first line pressure outlet port 422 of the gear position selector valve 414 being drained off, there is no fluid pressure developed in the control port 320 of the second-gear position lock valve 316, which is accordingly held in a condition having the valve spool 332 maintained in the second axial position by the force resulting the line pressure acting on the differential pressure acting area between the second and third circumferential lands 336 and 338 of the valve spool 32 against the force of the spring 340. In the second-gear position lock valve 316 is now provided communication between the second line pressure port 324 and the line pressure outlet port 326 so that the line pressure developed in the second line pressure outlet port 424 of the gear position selector valve 414 is directed through the fluid passageway 360, past the line pressure inlet and outlet ports 324 and 326 of the second-gear position lock valve 316 and by way of the band actuating fluid circuit 330 to the brake-apply fluid chamber 76' of the band servo unit 74. The brake band 72 being applied in addition to the forward drive clutch 42 which is maintained in the coupled condition with the third line pressure outlet port 426 of the gear position selector valve 414 held in communication with the line pressure inlet port 420 of the selector valve 414, the second gear ratio is established in the transmission mechanism shown in FIG. 1. Under the condition in which the second gear ratio in the manual second forward drive range "2" is thus established, there is a line pressure developed in the fourth line pressure outlet port 428 of the gear position selector valve 414. The line pressure in the port 428 of the gear position selector valve 414 is directed through the fluid passageway 464 to the second line pressure port 204 of the throttle back-up valve 198, which is as a consequence conditioned to develop in the port 206 thereof a throttle back-up pressure higher than the throttle pressure Pt normally produced by the transmission throttle valve 160. The throttle back-up pressure is passed to the transmission throttle valve 160 and through the throttle valve 160 and the throttle pressure circuit 196 to the throttle pressure port 148 of the line pressure booster valve 146 and maintains the line pressure Pl at an increased level throughout the manual second forward drive range condition. The line pressure passed to the fluid passageway 464 from the fourth line pressure outlet port 428 of the manually operated gear position selector valve 414 is further directed through the kickdown valve 394 and the fluid circuit 374 to the kickdown port 524 of the first-second gear shift valve 500 and the control port 366 of the pressure modulator valve 344. If, in this instance, the second valve spool 536 of the first-second gear shift valve 500 is in the second axial position thereof, the line pressure developed in the kickdown port 524 of the shift valve 500 acts on the differential pressure acting area $A_2$ between the first and third circumferential lands 548 and 552 of the valve spool 536 and causes the first and second valve spools 534 and 536 of the shift valve 500 to move into the respective first axial positions thereof. On the other hand, the line pressure developed in the control port 366 of the pressure modulator valve 344 acts on the valve spool 376 of the second-third gear shift valve 342 and the valve plunger 386 of the pressure modulator valve 344 and causes the valve spool and plunger 376 to move into or stay in their respective first and second axial positions. When the transmission gear shift lever is in the manual second forward drive range position "2", both of the first-second and second-third gear shift valves 500 and 342 are thus maintained in their respective first and second gear ratio conditions without respect to the governor pressure Pg in the respective governor pressure ports 510 and 348 of the gear shift valves 500 and 342 or, in other words, independently of the road speed of the vehicle.

If the transmission gear shift lever is moved to the manual first forward drive range posision "1" under these conditions, the manually operated gear position selector valve 414 is moved into the corresponding axial position causing the second line pressure outlet port 424 as well as the first line pressure outlet port 420 to be drained off through the first drain port 438 and permitting not only the third and fourth line pressure outlet ports 426 but the fifth line pressure outlet port 430 to communicate with the line pressure inlet port 420 of the gear position selector valve 14. The line pressure developed in the fifth line pressure outlet port 430 of the gear position selector valve 414 is directed through the passageway 466 to the first and third line pressure inlet ports 512 and 516 of the first-second gear shift valve 500. The line pressure thus developed in the third line pressure inlet port 516 acts on the respective outer end faces of the fifth circumferential land 546 of the first valve spool 534 and the axial extension 554 of the second valve spool 536 of the shift valve 500 with the result that the first and second valve spools 534 and 536 are forced to move away from each other into their respective first and second axial positions, thereby providing communication between the first line pressure inlet and outlet ports 512 and 518 and between the second line pressure outlet port 520 and the first drain port 526. The second line pressure outlet port 424 of the gear position selector valve 414 being drained off, furthermore the line pressure which has been developed in the second line pressure inlet port 324 of the second-gear position lock valve 316 is discharged through the passageway 460 and the ports 424 and 438 of the gear position selector valve 414. The valve spool 332 of the second-gear position lock valve 316 is therefore released from the line pressure which has been acting on the differential pressure acting area between the lands 336 and 338 of the valve spool 332 and is allowed to restore the first axial position thereof by the force of the spring 340, providing communication between the first line pressure inlet port 322 and the line pressure outlet port 326 of the valve 316. The line pressure which has been developed in the brake-apply fluid chamber 76 of the band servo unit 74 is now discharged by way of the band actuating fluid circuit 330 and through the ports 326 and 322 of the second-gear position lock valve 316, the passageway 328, and the second line pressure outlet port 520 and the first drain port 526 of the first-second gear shift valve 500 which is held in the first gear condition having the first and second valve spools 534 and 536 in their respective first axial positions maintaining communication between these ports 520 and 526 as above described. The line pressure being discharged from the brake-apply fluid chamber 76 of the land servo unit 74, the brake band 72 is released.

Communication being provided between the first line pressure inlet and outlet ports 512 and 518 of the first-second gear shift valve 500 as above described, the line pressure directed from the fifth line pressure outlet port 430 of the gear position selector valve 414 to the first line pressure inlet port 512 is passed through the first line pressure outlet port 518 of the shift valve 500 and is distributed through the low-and-reverse brake actuating fluid circuit 300 to the fluid chamber of the low-and-reverse clutch 68 and the first line pressure inlet port 202 of the throttle back-up line pressure developed in the first line pressure inlet port 202 of the throttle back-up valve 198 is admitted into one end portion of the valve chamber 200 of the throttle back-up valve 198 through the previously mentioned radial and axial passageway formed in the valve spool 212 and acts on the outer axial end of the first circumferential land 214 of the valve spool 212. The result is that the valve spool 212 which has been held in the previously mentioned equilibrium axial position producing the throttle back-up pressure in the port 206 is forcibly moved into the second axial position thereof against the force of the spring 220 and initially further against the force produced by the fluid pressure acting on the differential pressure acting area between the seond and third circumferential lands 216 and 218 of the valve spool 212. The throttle back-up pressure port 206 of the valve 198 is now isolated from the second line pressure port 204 and is made open to the drain port 208 of the valve 198 and, at the same time, the radial port formed in the valve spool 212 is brought into communication with the second line pressure inlet port 204. The line pressure in the second line pressure inlet port 204 of the throttle back-up valve 198 being maintained with the fourth line pressure outlet port 428 of the manually operated gear position selector valve 414 kept open to the line pressure inlet port 420 of the gear position selector valve 414, the valve spool 212 of the throttle back-up valve 198 is enabled to stay in the second axial position thereof by the line pressure developed in the second line pressure inlet port 204 of the valve 198 as indicated by the right half of the valve spool 212. The line pressure developed in the fluid chamber of the low-and-reverse brake 68 causes the brake 68 to apply and produce the first forward drive gear ratio in the transmission mechanism in cooperation with the forward drive clutch 42 which is maintained in the coupled condition. In contrast to the condition in which the first gear ratio ($D_1$) in the automatic forward drive range "D" is produced by the combination of the forward drive clutch 42 and the one-way clutch 70 (FIG. 1), the first gear ratio condition in the manual first forward drive range "1" is produced by the combination of the forward drive clutch 42 and the low-and-reverse brake 68 as above described so that the transmission mechanism is permitted to transmit therethrough a driving torque from the transmission output shaft backwardly to the transmission input shaft when the engine is to be braked upon by the vehicle inertia.

When, now, the transmission gear shift lever is moved from the neutral gear position "N" to the reverse drive gear position "R", the first, second and third line pressure outlet ports 422, 424 and 426 of the manually operated gear position selector valve 414 are drained off through the first drain port 438 of the selector valve 414 and, at the same time, the fourth, fifth and sixth line pressure outlets ports 428, 430 and 432 of the gear position selector valve 414 are permitted to be in communication with the line pressure inlet port 420 of the gear position selector valve 414. With the third line pressure outlet port 426 of the gear position selector valve 414 drained off, there is no fluid pressure developed in the forward drive clutch actuating fluid circuit 298 so that the forward drive clutch 42 is maintained in the uncoupled condition. In the absence of a fluid pressure developed at the fluid inlet port 258 of the secondary governor valve 86', furthermore, the transmission governor assembly 84 is maintained inoperative to deliver the governor pressure Pg so that there is no force urging the valve spools 534 and 376 of the first-second and second-third gear shift valves 500 and 342 to move away from their respective first axial positions. With the fourth and fifth line pressure ports 428 and 430 brought into play in the manually operated gear position selector valve 414, there is developed a line pressure Pl in each of the first and second line pressure inlet ports 202 and 204 of the throttle back-up valve 198, the control port 366 of the pressure modulator valve 344, and the first and third line pressure inlet ports 512 and 516 of the first-second gear shift valve 500 with the result that the first-second and second-third gear shift valves 500 and 342 are maintained in their respective first and second gear ratio conditions as under the above described manual first forward drive range conditions. The line pressure developed in the fifth line pressure outlet port 430 of the manually operated gear position selector valve 414 is therefore directed by way of the first line pressure inlet and outlet ports 512 and 518 of the first-second gear shift valve 500 and through the fluid circuit 300 to the fluid chamber of the low-and-reverse brake 68 and causes the brake 68 to apply.

The sixth line pressure inlet port 432 of the manually operated gear position selector valve 414 being open to the line pressure inlet port 420 of the valve 414, the line pressure is directed by way of the fluid circuit 368 to the line pressure port 150 of the line pressure booster valve 146 and to the first line pressure inlet port 350 of the second-third gear shift valve 342. The line pressure developed in the line pressure port 150 of the line pressure booster valve 146 acts on the differential pressure acting area between the lands 156 and 158 of the valve spool 154 and, in cooperation with the throttle pressure Pt acting on the outer end face of the first circumferential land 156 of the valve spool 154, urges the valve spool 154 to move away from the first axial position thereof and accordingly urges the valve spool 114 of the pressure regulator valve 94 to move toward the first axial position thereof, thereby giving rise to an increase in the line pressure Pl being developed by the pressure regulator valve 94. On the other hand, the second-third gear shift valve 342 being maintained in a condition establishing communication between the first line pressure inlet port 50 and the line pressure outlet port 354 of the valve 342 having the valve spool 376 held in the first axial position thereof, the line pressure developed in the first line pressure inlet port 350 of the gear shift valve 342 as above described in passed through the line pressure outlet port 354 of the valve 342 to the band releasing fluid circuit 370. The transmission governor assembly 84 being held in operative to develope a governor pressure Pg, there is no fluid pressure in the governor pressure port 476 of the second-third gearshift timing valve 472, which is as a consequence maintained in a condition having the valve spool 490 held in the first axial position thereof by the force of the spring 498 and the throttle pressure Pt developed in the port 478, thereby establishing communication between the line pressure inlet and outlet ports 480 and 482 of the gearshift timing valve 472. The fluid pressure developed in the band releasing fluid circuit 370 is therefore allowed to bypass the orifice 488 through these ports 480 and 482 of the second-third gearshift timing valve 472 and is directed at a relatively high rate into the fluid chamber of the high-and-reverse clutch 40.

With both of the high-and-reverse clutch 40 and the low-and-reverse brake 68 put into operation, the respective sun gears 52a and 54a of the first and second planetary gear assemblies 52 and 54 in the transmission mechanism shown in FIG. 1 are driven to rotate in the forward direction and the pinion carrier 60 for the second planetary gear assembly 54 is held locked. The transmission output shaft 64 for rotation in the reverse direction about the center axis of the shaft, producing the reverse drive gear condition in the transmission mechanism. The high-and-reverse clutch 40 and the low-and-reverse brake 68 thus actuated are acted upon by the line pressure which is boosted by the line pressure introduced into the line pressure port 150 of the line pressure booster valve 146 as previously described and are accordingly enabled to be maintained in the coupled and applied conditions, respectively, with adequate forces throughout the reverse driving operation of the vehicle.

When, now, the accelerator pedal is depressed a distance greater than a predetermined value from the fully released position thereof while the vehicle is cruising with the automatic forward drive range "D" selected at the transmission gear shift lever, the actuating plunger 412 of the kickdown valve 394 is moved deeper through the valve chamber 396 of the kickdown valve 394 and causes the valve spool 404 of the valve 394 to move from the first axial position to the second axial position thereof against the force of the spring 410, thereby providing communication between the second and third line pressure inlet ports 400 and 402 of the kickdown valve 394. The line pressure in the main line pressure circuit 130 is now passed through the third and second line pressure ports 402 and 400 of the kickdown valve 394 to the kickdown fluid circuit 374 and through the kickdown fluid circuit 374 to the kickdown port 524 of the first-second gear shift valve 500 and the control port 366 of the pressure modulator valve 344. If, in this instance, the third gear ratio ($D_3$) is established in the transmission mechanism with the second-third gear shift valve 342 held in the third gear ratio condition thereof when the kickdown condition is produced, the line pressure developed in the control port 366 of the pressure modulator valve 344 causes the valve spool 376 of the second-third gear shift valve 342 to move from the second axial position to the first axial position thereof and effects in the transmission mechanism a downshift from the third gear ratio ($D_3$) to the second gear ratio ($D_2$) in the automatic forward drive range "D". If, on the other hand, the second gear ratio ($D_2$) in the automatic forward drive range "D" is in play in the transmission system when the kickdown condition is brought about, the line pressure developed in the kickdown port 524 of the first-second gear shift valve 500 as above described acts on the first differential pressure acting area $A_1$ between the second and third circumferential lands 550 and 552 of the second valve spool 546 and, in cooperation with the force of the spring 560, causes the first and second valve spools 534 and 536 of the shift valve 500 to move from their respective second axial positions to the first axial positions, provided the vehicle speed being produced is of such a value that the force resulting from the governor pressure Pg acting on the first valve spool 534 is overcome by the sum of the force of the spring 560 and the force resulting from the line pressure acting on the first differential pressure acting area $A_1$ of the second valve spool 536. A forced downshift from the second gear ratio ($D_2$) to the first gear ratio ($D_1$) in the automatic forward drive range "D" is thus made under kickdown condition at vehicle speeds lower than a predetermined value dictated by the force of the spring 560 and the first differential pressure acting area $A_1$ of the second valve spool 546 of the first-second gear shift valve 500.

When the second valve spool 536 of the first-second gear shift valve 500 is moved into the first axial position thereof, the axially inner annular end faces of both of the first and third circumferential lands 548 and 552 of the second valve spool 536 of the shift valve 500 are subjected to the line pressure obtaining in the kickdown port 524 of the valve 500 so that the valve spools 534 and 536 are held in their respective forst axial positions by the force resulting from the line pressure acting on the second differential pressure acting area $A_2$ of the second valve spool 536 as well as the force of the spring 560 and the force resulting from the throttle pressure acting on the differential pressure acting area $A_o$ of the first valve spool 534. An upshift from the first gear ratio ($D_1$) to the second gear ratio ($D_2$) in the automatic forward drive range "D" under the kickdown condition in which a downshift has once been made between these gear ratios can not therefore be made unless the vehicle speed is increased to a level at which the resultant governor pressure is capable of overcoming the sum of these three opposing forces.

In the hydraulic control system in which the shift valve provided by the present invention is utilized as the first-second gear shift valve 500, the shift point for upshifting between the first and second gear ratios is determined by the force of the spring 560 and the pressure acting area $A_o$ of the first valve spool 534 under part-throttle condition of the engine and by not only these parameters but the first differential area $A_1$ of the second valve spool 536 under kickdown condition, while the shift point for downshiftbetween the first and second gear ratios is dictated only by the force of the spring 560 under part-throttle condition of the engine and by not only the force of the spring 560 but the second differential area $A_2$ of the second valve spool 536 under kickdown condition. Thus, the shift points for upshifting and downshifting between the first and second gear ratios under part-throttle and kickdown conditions can be selected independently by selecting the differential pressure acting areas $A_o$, $A_1$ and $A_2$ provided in the shift valve 500. Because, furthermore, of the fact that either the first differential pressure acting area $A_1$ or the second differential pressure acting area $A_2$ of the second valve spool 536 is selectively acted upon by the fluid pressure in the kickdown port 524 depending upon the axial position of the valve spool 536, the fluid pressure responsive to kickdown condition can be applied to the two differential pressureacting areas $A_1$ and $A_2$ by the use of only one kickdown port and a valve spool with only three lands. This will contribute to limiting the overall length of the shift valve capable of providing the above described shift points.

What is claimed is:

1. A hydraulic control system for an automatic transmission for a motor vehicle, the transmission being shiftable by at least one servo-actuator between a plurality of gear ratios, including at least a pair of relatively higher and lower forward drive ratios, the control system comprising:

a source of fluid;

means communicating with said source of fluid for producing in the hydraulic system a plurality of fluid pressures including a control pressure variable with operating conditions of the motor vehicle, an actuating fluid pressure selectively fed to the servo-actuator to effect shifting between gear ratios, and a kickdown fluid pressure for overriding said control fluid pressure in response to a vehicle condition wherein sudden acceleration is required;

a shift valve, including a movable valve element, communicating with said producing means such that said control pressure effects controlled movement of said valve element in response to vehicle operating conditions and such that movement of said valve element effects selective communication of fluid under the actuating pressure with the servo-actuator to cause shifting from one gear ratio to another, said valve element including a first position for establishing the lower gear ratio and a second position for establishing the higher gear ratio;

said valve element including a first effective kickdown pressure acting area which is selectively exposed to said kickdown pressure when said valve element is in said first position; said first effective kickdown pressure area, when acted upon by said kickdown pressure, urging said valve element to remain in said first position;

said valve element including a second effective kickdown pressure acting area, which is different in area from said first effective kickdown pressure acting area, and which is selectively exposed to said kickdown pressure when said valve element is in said second position, said second effective kickdown pressure area, when acted upon by said kickdown pressure, urging said valve element to move from said second position to said first position;

a passageway extending between said producing means and said shift valve to effect communication therebetween;

a single kickdown pressure port in said shift valve effecting communication between said passageway and both said first and second kickdown pressure acting area.

2. A hydraulic control system as defined in claim 1 wherein said first effective kickdown pressure acting area includes a first pair of oppositely disposed, spaced surfaces defined by a first groove in said valve element, one surface of said first pair being larger than the other, said first effective kickdown pressure acting area being defined by the difference between the one and the other surfaces of said first pair of surfaces, said second effective kickdown pressure acting area including a second pair of surfaces which are oppositely disposed and spaced at a greater distance from each other than said first pair of surfaces, one surface of said second pair being larger than the other surface of said second pair and being defined by the one groove in the valve element, the other surface of said second pair being defined by a groove different from said one groove defining said one surface of said second pair, said grooves defining said second pair of surfaces also defining therebetween a circumferential land on said valve element, said second effective kickdown pressure acting area being defined by the difference in areas between said one and said other surfaces of said second pair of surfaces; said valve element including an interior wall adjacent said kickdown pressure port, said land of said valve element engaging said interior wall when said valve element is in said first position to confine said kickdown pressure to acting on said one and said other surfaces of said first pair of surfaces, said land and said kickdown pressure port both having an axial dimension taken in the lengthwise axial direction of said valve and valve element, the axial dimension of the land being substantially less than the axial dimension of the kickdown pressure port, the land and kickdown pressure port being mutually so disposed that when said valve element is in the second position, said land registers with said kickdown pressure port without blocking communication with said one and said other surfaces of said second pair such that said one and said other surfaces of said second pair receive kickdown pressure to establish said second pressure acting area when said valve element is in said second position.

3. A hydraulic control system as defined in claim 2 wherein said other surface of said first pair of surfaces is defined by said land and wherein said first groove and said different groove are the same groove.

4. A hydraulic control system as defined in claim 1 wherein said valve element includes a first portion and a second portion arranged in series, which portions are of separate pieces and not affixed to each other so that one of said portions has the capability of selectively moving without the other portion moving, said first portion having at least one control pressure acting area, said second portion including said first and second kickdown pressure acting areas.

5. A hydraulic control system as defined in claim 1 wherein the motor vehicle has an engine and wherein said means for producing a control and actuating pressures includes: means for generating a control pressure variable with load on the vehicle engine, means for producing a control fluid pressure variable with vehicle speed, means for producing an actuating fluid pressure not less than said fluid pressure variable with load on the engine, and means for producing said kickdown pressure.

6. A hydraulic control system as defined in claim 5 wherein said means for producing kickdown pressure includes means for passing said actuating fluid pressure to said shift valve in response to a vehicle condition wherein sudden acceleration is required, whereby said kickdown pressure is substantially the same as said actuating pressure.

7. A hydraulic control system as defined in claim 1 wherein said second kickdown pressure acting area is larger than said first kickdown pressure acting area.

8. A hydraulic control system for an automatic transmission for a motor vehicle, the transmission being shiftable between a plurality of gear ratios including at least a pair of relatively higher and lower forward drive gear ratios, the vehicle having an operating condition requiring sudden acceleration as well as normal operating conditions other than the sudden acceleration condition, the control system comprising:

means for generating a kickdown fluid pressure for establishing or maintaining the lower gear ratio in response to the sudden acceleration operating condition of the vehicle;

means for shifting the transmission between the lower and higher gear ratios in response to variations in the normal vehicle operating condition;

first means, coupled with said shifting means and coupled with and responsive to said kickdown pressure generating means, for urging said shifting means, when in the lower gear ratio condition, to remain in the lower gear ratio condition notwithstanding a tendency of said shifting means to shift into the higher gear ratio condition;

second means, coupled with said shifting means and coupled with and responsive to said kickdown pressure generating means, for urging said shifting means, when in the higher gear ratio condition, to shift into the lower gear ratio condition notwithstanding a tendency of said shifting means to remain in said higher gear ratio condition;

a valve constituting at least portions of said shifting means and said first and second urging means;

a single kickdown pressure port in said valve, said first and second urging means of said valve both communicating with said kickdown pressure generating means through said single kickdown pressure port.

9. A hydraulic control system as defined in claim 8 wherein said valve includes a movable valve element therein, said valve element being movable between a first position establishing the lower gear ratio and a second position permitting establishment of the higher gear ratio, said first urging means including a first effective kickdown pressure acting area which is selectively exposed to said kickdown pressure when said valve element is in said first position, said first effective kickdown pressure area, when acted upon by said kickdown pressure, urging said valve element to remain in said first position, said valve element including a second effective kickdown pressure acting area, which is different in area from said first effective kickdown pressure acting area and which is selectively exposed to said kickdown pressure when said valve element is in said second position, said second effective kickdown pressure acting area, when acted upon by said kickdown pressure, urging said valve element to move from said second position to said first position.

10. A hydraulic control system for an automatic power transmission of an automotive vehicle having an engine, the vehicle having a kickdown condition in which sudden acceleration is required, the transmission being shiftable between lower and higher gear ratios, the hydraulic control system comprising:

first control pressure generating means for producing a first control fluid pressure variable with load on the engine;

second control pressure generating means for producing a second control fluid pressure variable with vehicle speed;

actuating pressure generating means for producing an actuating fluid pressure variable with said first control fluid pressure;

kickdown responsive valve means responsive to kickdown condition in the vehicle for passing said actuating fluid pressure therethrough;

a shift valve for shifting the transmission between lower and higher gear ratios;

first passageway means communicating with said shift valve and said first control pressure generating means;

second passageway means communicating with said shift valve and said second control pressure generating means;

third passageway means communicable with said shift valve and said actuating pressure generating means through said kickdown responsive valve means; and at least one valve element movable between a first position for producing in the power transmission the lower gear ratio and a second position for producing the higher gear ratio in the power transmission, said valve element being formed with a first pressure acting area to be acted upon by the first control fluid pressure in said first passageway means for urging the valve element in said first position to stay in the first position, a second pressure acting area to be constantly acted upon by the second control fluid pressure in said second passageway means for urging the valve element toward said second position, a third pressure acting area to be acted upon by the actuating fluid pressure in said third passageway means for urging the valve element in the first position to stay in the first position, and a fourth pressure acting area to be acted upon by the actuating fluid pressure in said third passageway means for urging the valve element in said second position to move toward said first position.

11. A hydraulic control system as defined in claim 10, comprising first and second valve elements which are arranged in series with each other and each of which has said first and second positions, said first and second pressure acting areas being formed on said first valve element and said second and third pressure acting areas being formed on said second valve element.

12. A hydraulic control system as defined in claim 10, in which said fourth pressure acting area is larger than said third pressure acting area.

13. A hydraulic control system as defined in claim 12, in which said second valve element is formed with first, second and third lateral lands which have different cross sectional areas and which are axially spaced apart from each other with the second lateral land between the first and third lateral lands, said third pressure acting area being formed between said second and third lateral lands and said fourth pressure acting area being formed between said first and third lateral lands.

14. A hydraulic control system as defined in claim 13, in which said second valve element has a lateral groove between the first and second lateral lands and a lateral groove between the second and third lateral lands and in which said third passageway means comprises a single port to which said groove between the second and third lateral lands is open when the second valve element is in the first position thereof and both of the grooves between the first, second and third lateral lands are concurrently open when the valve element is in the second position thereof.

15. A hydraulic control system as defined in claim 13 further comprising resilient biasing means urging said second valve element toward the first position thereof.

* * * * *